United States Patent
Lowe et al.

(10) Patent No.: US 9,087,178 B2
(45) Date of Patent: Jul. 21, 2015

(54) SYSTEM AND METHOD FOR POSTING CONTENT TO NETWORK SITES

(75) Inventors: Alexander Lowe, Sacramento, CA (US); Dat Tau, Elk Grove, CA (US)

(73) Assignee: CONVIVIAL CORPORATION, Sacramento, CA (US)

( * ) Notice: Subject to any disclaimer, the term of this patent is extended or adjusted under 35 U.S.C. 154(b) by 53 days.

(21) Appl. No.: 13/456,001

(22) Filed: Apr. 25, 2012

(65) Prior Publication Data

US 2013/0291079 A1    Oct. 31, 2013

(51) Int. Cl.
*H04L 9/32* (2006.01)
*G06F 21/00* (2013.01)
*G06F 15/16* (2006.01)
*G06Q 50/00* (2012.01)

(52) U.S. Cl.
CPC ............... *G06F 21/00* (2013.01); *G06F 15/16* (2013.01); *G06Q 50/01* (2013.01); *H04L 9/32* (2013.01)

(58) Field of Classification Search
CPC ............ H04L 9/32; G06F 15/16; G06F 21/00
USPC .................................. 726/7; 715/723; 705/14
See application file for complete search history.

(56) References Cited

U.S. PATENT DOCUMENTS

| | | | |
|---|---|---|---|
| 2010/0313255 A1* | 12/2010 | Khuda | 726/7 |
| 2011/0010384 A1* | 1/2011 | Luo et al. | 707/769 |
| 2012/0011540 A1* | 1/2012 | Pulford | 725/32 |
| 2012/0089451 A1* | 4/2012 | Agramonte et al. | 705/14.23 |
| 2012/0290399 A1* | 11/2012 | England et al. | 705/14.66 |

* cited by examiner

*Primary Examiner* — Brandon Hoffman
*Assistant Examiner* — Samuel Ambaye

(57) ABSTRACT

A system and method for posting content to network sites are disclosed. A particular embodiment includes providing, by use of a data processor, a user interface at a location-specific kiosk, the user interface enabling a user to capture an image at the location-specific kiosk; applying an overlay to the captured image to produce posting content; receiving a community site selection and community site credentials at the location-specific kiosk; using the community site credentials to authenticate with the selected community site via a data network; and posting the posting content at the authenticated community site via the data network.

24 Claims, 16 Drawing Sheets

Photo Kiosk Components

Posting Process

SYSTEM AND METHOD FOR POSTING CONTENT TO NETWORK SITES

COPYRIGHT

A portion of the disclosure in this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the software, data, and documentation as described below and in the drawings that form a part of this document: Copyright 2011-2012 iSnap Corporation, All Rights Reserved.

TECHNICAL FIELD

This patent application relates to a system and method for use with networked computer systems, according to one embodiment, and more specifically, to a system and method for posting content to network sites.

BACKGROUND

Using technology available today, individuals can use numerous methods for recording digital images of photographed subjects in a still or video form. People can capture these images with digital cameras, cell phone cameras, Personal Digital Assistants (PDAs) and/or other smart devices. Such devices have the ability of storing these images for later access, and further support the ability to disseminate them via the internet. However, these image capture devices are typically mobile and thus are not location-specific. Other conventional technologies provide location-specific kiosks for use in various applications. For example, some kiosks provide DVD rentals, coin exchanges, remote banking or payment stations, or photographic processing. Other well-known photo kiosks can be generally configured in the form of booths or stalls, where users or subjects can pose against a background fixed in the enclosed area while the users take a photograph of themselves. While some of these kiosks have limited forms of network connectivity, the conventional kiosks are nevertheless usually stand-alone systems.

Social networks have gained in popularity as people have started to use content sources and content itself as a basis for connecting with each other. Various conventional sites, such as facebook.com, twitter.com, linkedin.com, youtube.com, and pinterest.com are just a few examples of the community resources and social networks that have grown in popularity. However, the location-specific devices and kiosk systems in the conventional technologies have not been able to exploit and commercialize the communication capabilities of the social networks and other network resources.

BRIEF DESCRIPTION OF THE DRAWINGS

The various embodiments is illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
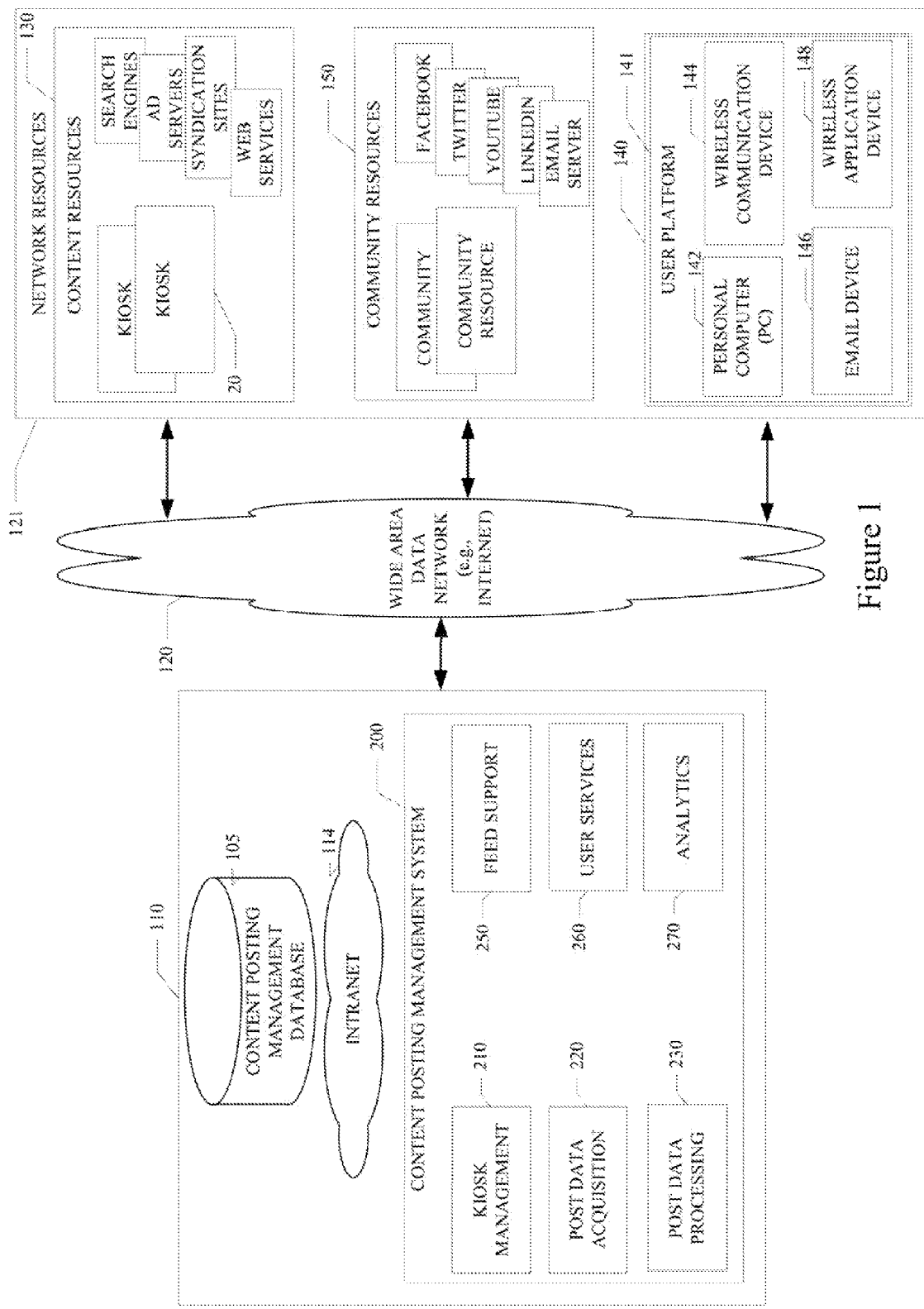
FIG. 1 illustrates an example embodiment of a system and method for posting content to network sites.

Referring to FIG. 1, in an example embodiment, a system and method for posting content to network sites are disclosed. In various example embodiments, an application or service, operating on a kiosk 20 and/or host site (e.g., a website) 110, is provided to simplify and facilitate content posting from a location-specific, image-capture device, provided by kiosk 20, to a community resource 150, such as facebook.com, twitter.com, an email server, or the like. Once content is posted to a community resource 150 as facilitated by the host site 110, users at network-connected platforms 140 can view the postings at the community resource 150 sites. The host site 110 can thereby be considered a content posting management site 110 as described herein. Multiple network resources 121 can be used by the content posting management site 110 to receive and transmit data. For example, content resources 130 can include a plurality of location-specific, image-capture device, such as kiosks 20. As described in more detail below, kiosks 20 are image capture systems physically located in a variety of popular venues, such as amusement parks, malls, resorts, hotels, airports, and the like. Content resources 130 can also include a variety of network-accessible sites or websites, such as search engines (e.g., Google), advertising servers or ad repositories, syndication sites (e.g., sites or devices supporting content feeds, such as Atom, Really Simple Syndication—RSS, Representational State Transfer—REST, and the like), web services (e.g., Amazon SQS, web feed services, and the like), and other sites providing desired content and/or services, which can be accessed and/or used by host site 110. Syndication sites can include websites, feed-enabled devices, such as mobile devices with applications configured for content feeds, web widgets, alternate display devices, and the like. Content resources 130 can be accessed directly using a link or uniform resource locator (URL). Content resources 130 can be used to obtain or service a variety of network-transportable digital content, such as web pages, documents, images, video, audio, media, and other forms of content available via a wide area data network, such as the Internet 120. For example, the kiosks 20 of content resources 130 can be used to originate photographs or videos of people present at a particular venue where the kiosk 20 is located.

Community resources 150 are network-accessible sites on which individuals, businesses, organizations, or other entities may create identities with associated profiles and provide information about the entity and a means for communicating with the entity. Such identities and profiles can include biographical information, product/service information, contact information, historical information, transactional information, affinity information, affiliation information, or a wide variety of structured or unstructured information related to a particular entity. Various conventional sites, such as facebook.com, twitter.com, youtube.com, linkedin.com, and pinterest.com are just a few examples of the available community resources 150. These sites operate as gathering locations for users to connect and form groups or communities of users. Sometimes, these types of sites are denoted as social networks. It will be apparent to those of ordinary skill in the art that content resources 130 can be any of a variety of networked content providers or service providers. It will also be apparent to those of ordinary skill in the art that community resources 150 can include a variety of network sites including, social network sites, data aggregation sites, marketing sites, financial sites, news sites, and the like. The content posting management site 110, content resources 130, community resources 150, and user platforms 140 may communicate and transfer information via a wide area data network (e.g., the Internet) 120. Various components of the content posting management site 110 can also communicate internally via a conventional intranet or local area network (LAN) 114.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital User Lines (DSLs), wireless links including satellite links, or other communication links known to those of ordinary skill in the art. Furthermore, remote computers and other related electronic devices can be remotely connected to either LANs or WANs via a modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 114 may also include an autonomous system of terminals, gateways, routers, and the like connected by wireless radio links or wireless transceivers. These connectors may be configured to move freely and randomly and organize themselves arbitrarily, such that the topology of networks 120 and 114 may change rapidly.

Networks 120 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The content resources 130 may include any of a variety of providers of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), Joint Photographic Experts Group (JPEG) format, Tagged Image File format (TIFF), audio (e.g., Motion Picture Experts Group Audio Layer 3-MP3, and the like), video (e.g., MP4, and the like), and any proprietary interchange format defined by specific content sites can be supported by the various embodiments described herein.

In a particular embodiment, a user platform 140 with one or more client devices 141 enables a user to access a content resource 130, a community resource 150, or the content posting management site 110 via the network 120. Client devices 141 may include virtually any computing device that is configured to send and/or receive information over a network, such as network 120. Such client devices 141 may include portable devices 144, 146, or 148 such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers (PCs) 142, multiprocessor systems, microprocessor-based or programmable consumer electronics, network PC's, and the like. As such, client devices 141 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message with relevant information.

Client devices 141 may also include at least one client application that is configured to receive content or messages from another computing device via a network transmission. The client application may include a capability to provide and receive textual content, graphical content, video content, audio content, alerts, messages, notifications, and the like. Moreover, client devices 141 may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. Client devices 141 may also include a wireless application device 148 on which a client application is configured to enable a user of the device to send and receive information to/from network resources 121 wirelessly via the network 120.

Referring still to FIG. 1, host site 110 of an example embodiment is shown to include a content posting management system 200, intranet 114 (optional), and content posting management database 105. Content posting management system 200 includes kiosk management module 210, post data acquisition module 220, post data processing module 230, feed support module 250, user services module 260, and analytics module 270. Each of these modules can be implemented as software components executing within an executable environment of content posting management system 200 operating on host site 110. Each of these modules of an example embodiment is described in more detail below in connection with the figures provided herein.

Figure 2:
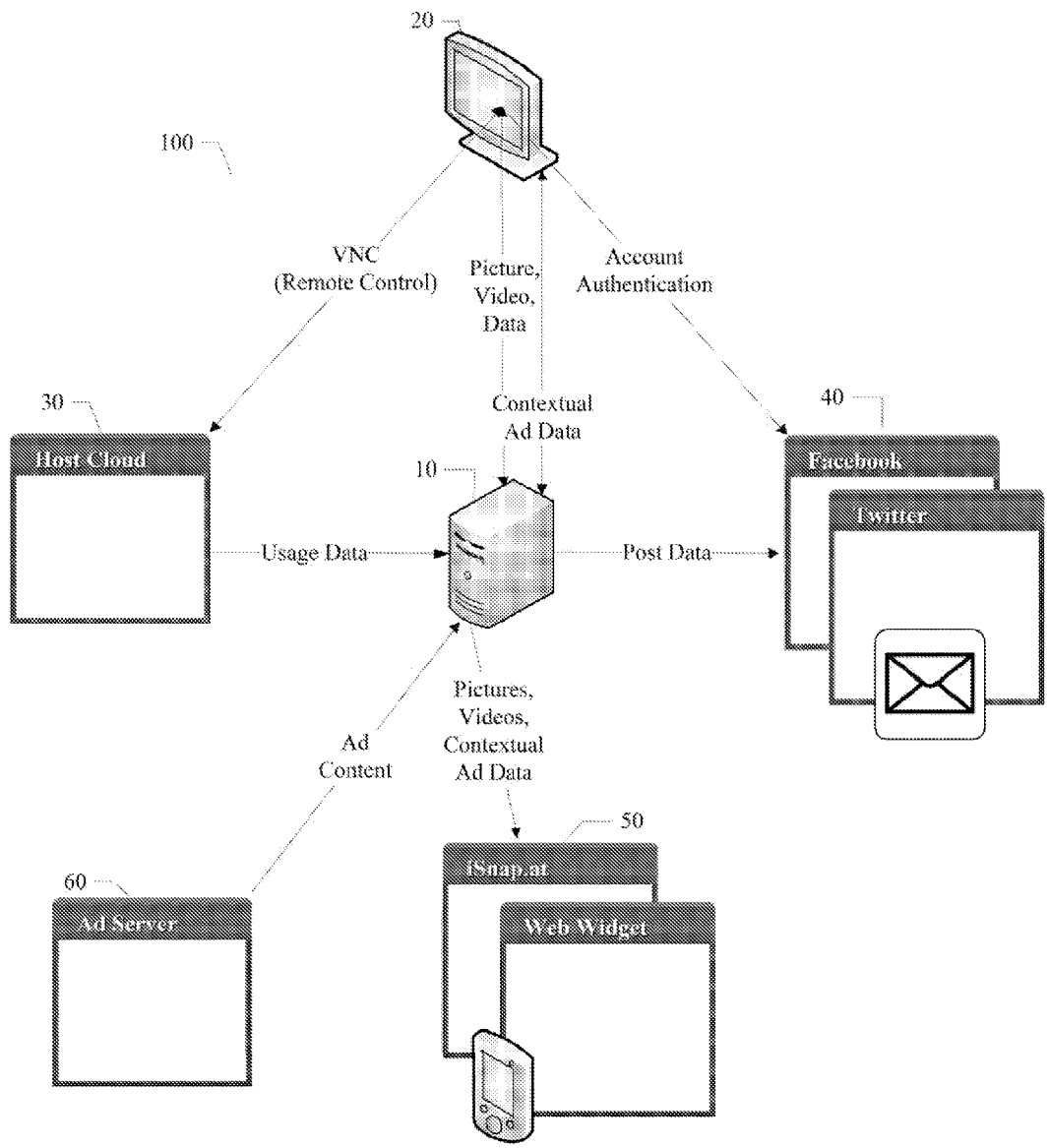
FIG. 2 illustrates a system overview of an example embodiment.

Referring now to FIG. 2, a system overview of an example embodiment is illustrated. In a particular embodiment, the system 100 includes a host server 10 in networked data communication with a kiosk 20, a host cloud 30, one or more community sites 40, one or more syndicated sites 50 or resources supporting Atom or RSS feeds, and one or more advertising or marketing content servers 60. The kiosk 20, described in more detail below, is an image and/or motion video capturing device located at a known physical location and under control of a host server 10. Using the user interfaces and data processing described in more detail below, a user can interact with kiosk 20 and cause a picture or video to be captured at the kiosk 20. The user can also enter a brief message with the picture or video. In one embodiment, the user-entered message can be appended to the picture or video. The user can also optionally annotate the picture or video. The user can also specify a particular community resource 40 (or more than one community resource 40), such as facebook.com or twitter.com and enter corresponding account credentials associated with the specified community resource(s) 40. In one embodiment, the kiosk 20 can obtain the identity of the selected community resource(s) 40 and the account credentials entered by the user at the kiosk 20 and authenticate the user's account on the corresponding community site(s) 40. In another embodiment, the host server 10 can obtain the identity of the selected community resource and the account credentials entered by the user at the kiosk 20 and authenticate the user's account on the corresponding community site(s) 40. In yet another embodiment, the kiosk 20 or host server 10 can obtain the identity of the selected community resource and the account credentials from a previously-entered user profile and authenticate the user's account on the corresponding community site(s) 40. In any of these implementations, a single sign-on capability can be provided to the user. Single sign-on in an example embodiment is described in more detail below. Upon successful user authentication, the kiosk 20 (or via the host server 10) can automatically post the picture or video and the user's message to the selected community site(s) 40. In this manner, a user at a particular kiosk 20 location can automatically post content to one or more community sites 40. In one embodiment, the user can post to multiple community sites 40 using a single user input (e.g., a click, keystroke, voice command, or the like). In another embodiment, a user can post to multiple page targets to 'like', 'checkin', etc. with a single trigger/click. This feature provides the ability to like, checkin, and/or post to multiple targets just by making one post.

In other example embodiments, additional features, such as social media check-in, age verification, and a single touch to post feature can be implemented. These features are described below.

Social Media Check-in: Because the kiosk 20 knows its geo-location and a source for the location's community resource information, we can automatically 'check-in' the user to the particular geo-location when the user interacts with the kiosk 20.

Age Verification: As part of the log-in or sign-in process, the user may be prompted for their age or birthdate. Based on that age information, the user may not be allowed to use the device (e.g., too young), or the user may be processed differently (e.g., a picture won't be posted to an inappropriate community site {e.g., a community site associated with adult, alcohol-related, or gambling content}, or the posting content may not be syndicated out to a network resource), or a different selection of overlays, sponsors, etc. can be provided to a kiosk end user based on the age of the user.

Single Touch to Post (different from single sign-on): In one embodiment, a single touch posting feature can be implemented in a manner similar to the Amazon 1-Click shopping feature. In the embodiment, the single touch posting feature enables the user to log into their host account, the picture-taking process at the kiosk 20 automatically starts, and the picture is immediately posted to their community resource site 40. In this case, the only action from the user is that they signed into the host and the rest of the picture-taking process is automated. Note that the single touch to post feature is different from the single sign-on feature also described herein.

Figure 3:
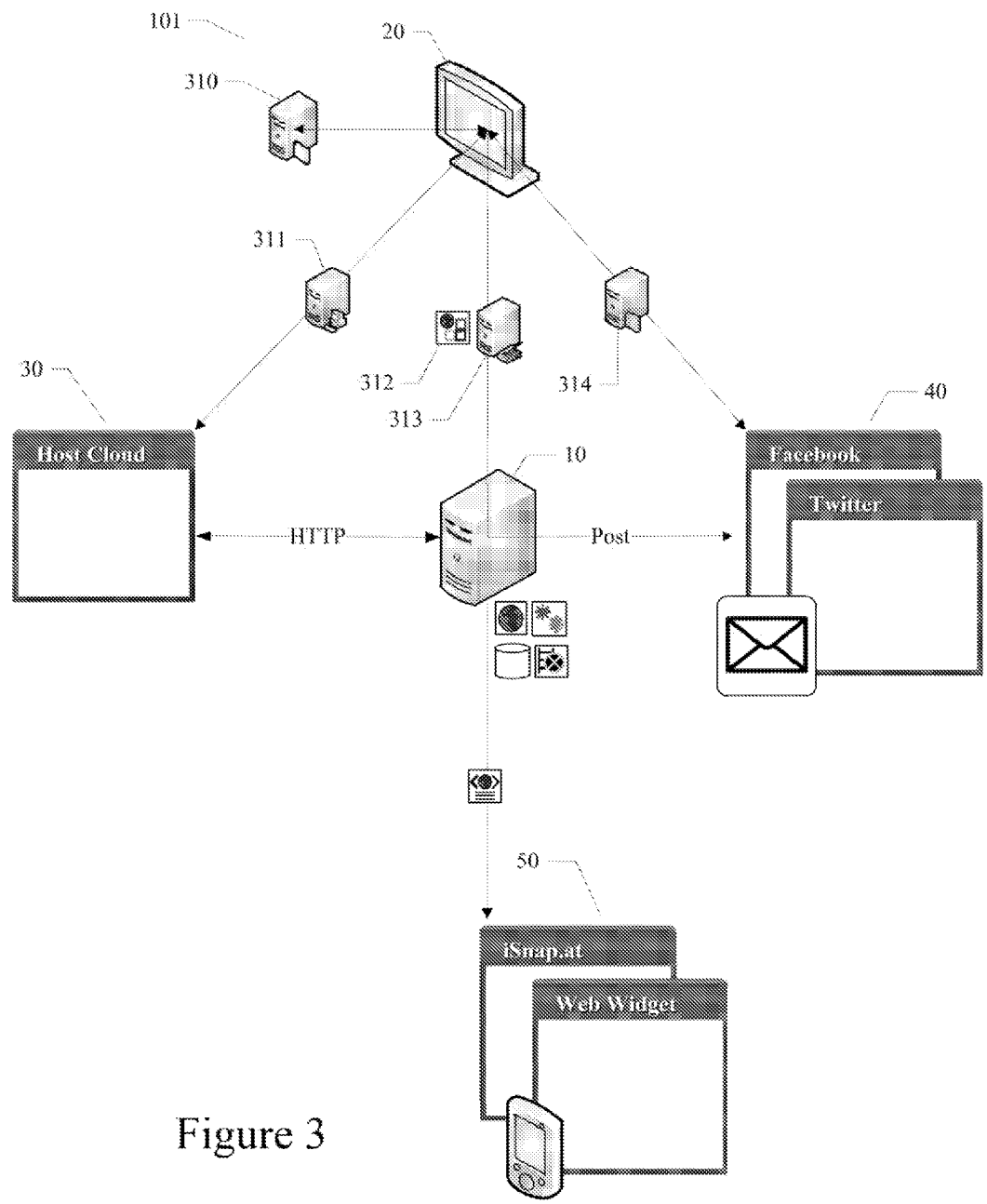
FIG. 3 illustrates a system overview with servers and system interfaces in an example embodiment.

Still referring to FIG. 2, the system 100 includes a host cloud 30, which represents a back office interface into host server 10 for management of the host server 10, the kiosks 20, and the associated network. The host cloud 30 can also collect usage data via the host server 10, the usage data being generated on the kiosks 20 by the interactions of users of the kiosks 20. The usage data is a portion of the contextual data set described in more detail below. The host cloud 30 can use a virtual network channel (VNC) to connect with the kiosk 20 in a private data exchange via a virtual private network (VPN) server. The VNC can be used to initialize and configure the kiosks 20 for operation in system 100. The detail of this connection is shown in FIG. 3. Additionally, as also shown in FIG. 3, the software in kiosks 20 can be downloaded or updated from a file transport protocol (FTP) server using well-known techniques. The kiosk 20 software itself is described in more detail below in connection with FIG. 5.

Referring again to FIG. 2, the system 100 can include a connection to one or more syndication sites 50. Syndication sites 50 represent sites or devices (e.g., mobile devices), which can pull content via conventional Atom or RSS feeds and make approved content available for public consumption to a variety of consumers, including websites, website widgets, mobile devices, mobile apps, and the like. RSS (Really Simple Syndication) is a family of standard web feed formats used to publish frequently updated works, such as image captures, blog entries, news headlines, audio, and video, in a standardized format. An RSS document (which is called a feed, web feed, or channel) includes content with full or summarized text, plus metadata such as publishing dates and authorship. RSS feeds benefit publishers by letting them syndicate content automatically. A standardized XML file format allows the information to be published once and viewed by many different programs. RSS feeds benefit readers who want to subscribe or otherwise obtain access to timely updates from favorite websites or to aggregate feeds from many sites into one place. The host server 10 can collect the content and related data generated on the kiosks 20 by the interactions of users of the kiosks 20. As described above, this content can be posted to the community sites 40 as selected by the user who originated the content at the kiosk 20. Additionally, the host server 10 can make this content and related data generated on the kiosks 20 available to the syndication sites 50 as content feeds. The host server 10 can configure the content to be compatible with an Atom or RSS feed, which can pull the content to various syndicated websites or devices. The host server 10 protects the content by preventing access to the content by any unauthorized sites or devices. The host server 10 provides a security feature through the kiosks 20 wherein the user at the kiosk 20 can approve or disapprove the syndication and subsequent general publication of the user's content generated at the kiosk 20.

Referring still to FIG. 2, the system 100 can include a connection to one or more advertising (ad) or marketing content servers 60. Advertising or marketing content servers 60 represent sites at which various promotional, advertising (ad), or marketing content (e.g., ad impressions, banner ads, listings, logos, surveys, promotional offers, coupons, contests, lead generation, and the like) is stored or sites from which the ad content can be retrieved. As well-known, ad servers 60 can be provided by advertisers, product/service providers, ad or marketing content aggregators, and the like. As also well-known, ad servers 60 can serve up ads according to various matching or filtering criteria, including product/ service category, keyword matching, geo-location, demographic profiling, and the like. In this manner, ad servers 60 can provide ad content matching, which is relevant to the various matching or filtering criteria. Given the ad content available via the ad servers 60, host server 10 can gather a variety of contextual data related (or potentially related) to a user interacting with a kiosk 20. This contextual data is detailed below in connection with FIG. 12. In general, the contextual data includes data captured from various sources that specifies user characteristics, location, time, user actions, ancillary data obtained from sites with which the user has interacted, community resources related to the user, user data or profiles obtained via search engines, demographic data, image recognition data, text recognition data, explicit user selections or preference data, and a variety of other information that is indicative of user affinity for particular types of products/services or event targeting. The host server 10, in combination with the kiosk 20, can gather and process the contextual data and develop a set of ad matching or filtering criteria, which can be used by the host server 10 to request relevant ad content from the ad servers 60. In an alternative embodiment, the host server 10 can maintain its own database of ad content, which can be used as a source of ad content relevant to the set of ad matching or filtering criteria, which in turn, is relevant to the contextual data gathered by the host server 10. As shown in FIG. 2, the host server 10 gathers a portion of the contextual data from the user interaction at the kiosk 20. As described above, this contextual data is used to fetch relevant ad content from the ad servers 60. The relevant ad content can then be transferred to the kiosk 20 and merged with the image captured as part of the user's interaction with the kiosk 20. This user interaction with the kiosk is described in more detail below. The contextual data can also be used to implement automatic tagging of posting content. For example, automatic tagging of posted content can be based on image recognition, location, event, brand, or other information related to the user that can be inferred. Additionally, meta data (such as exif) can be added to the posting content. The meta data can be used to trace the consumption of the posting content throughout the network.

In addition to image analysis/recognition, an example embodiment can provide sentiment analysis of posting content text and of response text and can trigger notifications or other actions based on detected sentiment. In one embodiment, sentiment analysis can be performed on the messages the user can post along with their pictures. Based on a detected sentiment, subsequent actions may be triggered, such as an action for someone to follow up with the user who originated the message. For example, if the user posted something like: "Excalibur sucks!" as part of a posted message, the detection of this negative sentiment would trigger a 'bad sentiment' action, automatically send an email out to a customer service representative (CS) (e.g., a CS for the Excalibur Hotel), and the CS representative could contact the user to follow up.

In an example embodiment, contextual ads based on image analysis/recognition can be displayed on a primary screen (e.g., the kiosk 20 display screen or a display screen of a user at a community site 40) and/or a secondary screen, such as a network-connected advertising display, a mobile device, or the like. The contextual data can be used to change the user layout or interface on kiosk 20. Additionally, the contextual ad data can also be used in other contexts, such as determining what to display on a secondary screen, or determining what to display on a mobile device with a mobile application in proximity to the kiosk 20. Additionally, ad campaign scheduling can be performed on kiosk 20. As part of the whole contextual ad system as described herein, ad campaigns can be scheduled within that system. Additionally, influencing ads can be distributed in a target channel related to the posting content. For example, a user shares a picture in posting content from venue A with friends on a social network (e.g., at a community site 40) as described above. Based on the list of friends who received the posting content or who are known to be friends of the originator of the posting content, the host server 10 can generate contextual ads for the friends, the contextual ads being related, for example, to the venue A where the posting content originated. In this manner, the host server 10 can enable recipients of the posting content on the social network to receive ads about venue A for a following period of time (e.g., two weeks).

In an example embodiment, a host mobile application (app) provided with a mobile device (e.g., mobile phone, PDA, tablet, etc.) can determine if the mobile device is near a kiosk 20. This proximity detection can be implemented using NFC, WiFi, or other conventional broadcast signals from the kiosk 20 to a proximate mobile device. Once the mobile device is detected near a kiosk 20, the mobile app can automatically configure itself for that device/location/event. For example, someone's at a Giant's baseball game. There are kiosks 20 in the stadium. A user also has a host mobile app on their mobile device. The mobile app may start streaming pictures that occurred during the game through the host app, or the host app can pull up news and events occurring within the location. In this manner, an example embodiment provides a feature for linking a person to a location through a mobile device. So, if someone has a host mobile app, the host mobile app can sense if the mobile device (hence the user) is in proximity to a kiosk 20.

In an alternative embodiment, the kiosk 20 can include a built-in interface to a cellular communication network. Using conventional technology, the kiosk 20 can be configured to establish an internet (or other network) connection via the cellular network. This would allow someone to set up and activate a kiosk in any area with a cellular connection without any action prior to installation. For example, the user receives a device, moves it to the property location, set ups a cellular account on the kiosk, and configures the kiosk for operation without having to pre-configure/activate a cellular account or set up an internet connection at the location. Additionally, the quick set-up configuration is not limited to just cellular, but can include other internet technologies such as WiMax, etc. . . . Once the network connection is established, the kiosk 20 can perform the features as described herein.

As shown in FIG. 2, Photo Kiosk 20 allows a user to take a picture or video, enter their account credentials, and send it directly to Facebook, Twitter, or Email. Host Server 10 processes, warehouses, and serves pictures, videos, information, and ads to and from Kiosks. Regarding Community Networks 40, pictures and videos taken from the Kiosk will be posted to various community networks and systems, such as Facebook, Twitter, or Email. Host Cloud 30 is a back office for users to view data stored and processed on the Host Server. Host Cloud 30 also allows users to remotely configure and manage Kiosks. Regarding Public Consumption (Syndication) 50, pictures and videos taken by kiosks can be pulled via an Atom/RSS Feed for consumption, such as websites (www.i-snap.at, website widget) or mobile devices (android, iphone apps). Only posts 'approved' by the originating user can be pulled by the Atom/RSS Feed. Regarding Advertisement or Marketing Content 60, ad content can be retrieved from the Ad Server.

FIG. 3 illustrates a system overview with servers and system interfaces in an example embodiment. In a particular embodiment similar to the embodiment shown in FIG. 2, the system 101 includes a host server 10 in networked data communication with a kiosk 20, a host cloud 30, one or more community sites 40, and one or more syndicated sites 50 or resources supporting Atom or RSS feeds. As described above, the host cloud 30 can use a virtual network channel (VNC) to connect with the kiosk 20 in a private data exchange via a virtual private network (VPN server. The VNC can be used to initialize and configure the kiosks 20 for operation in system 101. Additionally, as also shown in FIG. 3, the software in kiosks 20 can be downloaded or updated from a file transport protocol (FTP) server using well-known techniques. As also shown in FIG. 3, the data exchange between the kiosk 20 and the host server 10 can be configured through web services and web-based queuing (e.g., Amazon Simple Queue Service—SQS). A web queuing configuration facilitates the implementation of an automated workflow without requiring that either the sending system or the receiving system be available. In system 101, web services can be used for applying settings and configuration data to the kiosk 20 processing logic. The host server 10 can apply these settings and configurations using web services. Web-based queuing can be used to transfer content, transactional data, and contextual data between the host server 10 and the kiosk 20. System 101 provides a highly efficient and scalable implementation design.

In a particular embodiment, system 101 can also employ a proxy server for handling the authentication of a user account on a community site 40 from the kiosk 20. In some cases, the fraud detection functionality of some community sites 40 may reject access requests from unexpected locations. The proxy server can prevent these unnecessary authentication rejections by offering a consistent Internet Protocol (IP) address to the community site 40. The proxy server IP address can be whitelisted at the community site 40 thereby increasing the likelihood that the user's authentication request will be granted by the community site 40. The proxy server can also serve to provide a uniform interface to the community sites 40 for the kiosk 20. In this manner, the complexity of the kiosk 20 processing logic can be simplified.

As shown in FIG. 3, regarding FTP Server 310, software updates to the kiosk are pulled from an FTP Server. Regarding VPN Server 311, users on the Host Cloud can connect to Kiosks via VNC through a VPN connection. Regarding Web Services 312, setting and configuration data is sent through Web Services. Regarding Amazon SQS 313, media and transactional data is sent through Amazon SQS. Regarding Proxy Server 314, authentication occurs through a proxy server to maintain the same source IP. The IP address is whitelisted for additional security clearance. Host Server 10 is comprised of a Web, Data, Advertising, and Processing Server. Regarding Posts to sites 40, network posts are performed from the Host Server via any protocol and process as required by the Network. Regarding Atom/RSS Feeds to sites 50, post information (including pictures and videos), can be pulled from the Host Server via RSS Feeds.

Figure 4:
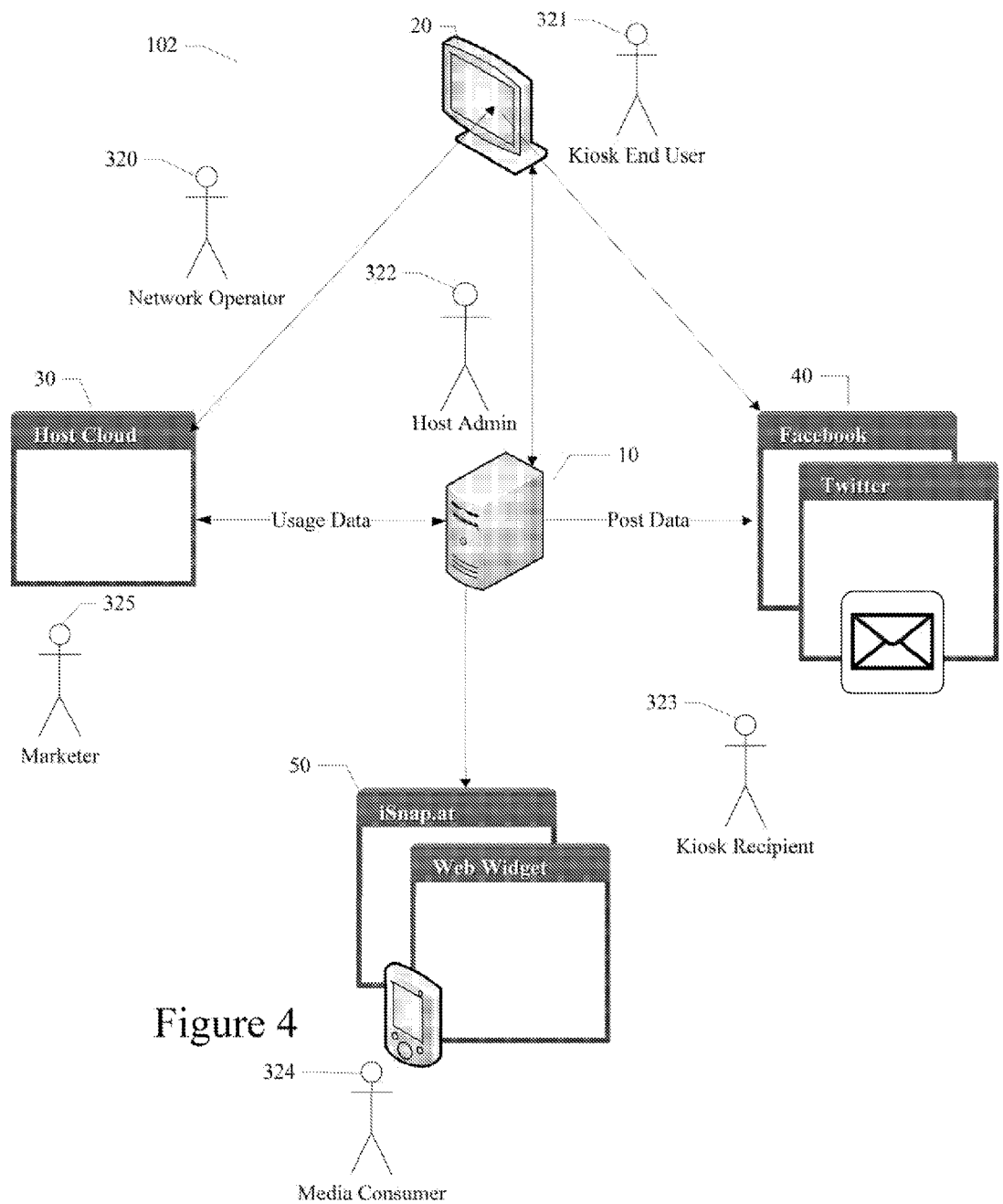
FIG. 4 illustrates a system overview with related actors in an example embodiment.

FIG. 4 illustrates a system overview with related actors in an example embodiment. In a particular embodiment similar to the embodiment shown in FIG. 2, the system 102 includes a host server 10 in networked data communication with a kiosk 20, a host cloud 30, one or more community sites 40, and one or more syndicated sites 50 or resources supporting Atom or RSS feeds. In system 102, various actors (people) play roles in the data processing performed by system 102. For example, as shown in FIG. 4, a kiosk end user represents a person who is physically located proximately to the kiosk 20 and who has engaged the kiosk in an interaction. This user interaction may start with the kiosk end user touching a button on the kiosk 20, inserting a card into the kiosk 20, speaking a command into a microphone of the kiosk 20, or merely standing within a proximity zone around the kiosk 20 as detected by a web-connected camera (webcam) of the kiosk 20. This user interaction may start at the kiosk 20 in a variety of other ways as well. For example, the kiosk end user may engage the kiosk 20 using a QR (Quick Response) Code, a Near Field Communication (NFC) interaction, cell phone, detection of a wireless device, and the like. As described in more detail below, this interaction between the kiosk end user and the kiosk 20 may result in content (e.g., images, videos, audio, and/or text) being produced for the kiosk end user by the kiosk 20. This content can be automatically posted to the community sites 40 by the operation of system 102.

Referring still to FIG. 4, a kiosk recipient represents another type of human actor interacting at a user platform 140 and establishing a connection with a community site 40 using conventional means. Once connected and/or logged into a community site 40, the kiosk recipient can receive and view content posted to the community site 40 from the kiosk end user via the kiosk 20 and host server 10. For example, the kiosk recipient may be a facebook.com user who is a friend of the kiosk end user. Once the kiosk end user posts content to his/her facebook.com account by operation of system 102, the kiosk recipient can receive and view the content posted to his/her friend's facebook.com account.

Referring still to FIG. 4, a media consumer represents another type of human actor involved in system 102. A media consumer can interact at a user platform 140 and establish a connection with a website using conventional means. As described above, some websites can be configured with syndicated content pulled from host server 10 via Atom/RSS feeds. In this manner, the content created at kiosk 20, and approved by the kiosk end user, can be posted to syndicated websites and viewed by a media consumer. As a result, the media consumer does not have to log into a community site 40 to access or view the posted content. Typically, the media consumer has no particular relationship to the kiosk end user who created the content at kiosk 20. Nevertheless, the kiosk end user who created the content at kiosk 20 is given the opportunity to approve or decline the posting of his/her content to the syndicated websites 50. Alternatively, the kiosk 20 can be preconfigured to automatically approve or decline the posting of content to the syndicated websites 50.

Referring still to FIG. 4, a marketer represents another type of human actor involved in system 102. A marketer can interact at a user platform 140 and establish a connection with the host cloud 30 using conventional means. The marketer must present authentic and authorized credentials prior to logging into the host cloud 30. Once logged in, the marketer can obtain access to the usage data collected at the kiosk 20 and retained by the host server 10. This usage data can include kiosk end user identifying information, demographic information, content information, other contextual information, kiosk interaction information, lead generation information, and a variety of information that may be useful to an advertiser, a product/service provider, a venue manager, or other person involved in target marketing. Because the kiosk 20 is location and/or venue specific, the interactions with the kiosk 20 by the co-located kiosk end users can provide a wealth of information for marketers. This information can be obtained by marketers via the host cloud 30.

Referring still to FIG. 4, the network operator and the host administrator represent other types of human actors involved in system 102. The network operator manages the network of kiosks 20. As described above in connection with FIG. 3, the network operator can use a VPN server and an FTP server to load, configure, and manage the operation of the kiosks 20. The host administrator represents the actor(s) responsible for the operation of the system 102. Given responsibility for managing the host server 10, host cloud 30, and the interaction with kiosks 20, the host administrator can load, configure, monitor, troubleshoot, and repair the various components of system 102 to ensure secure and reliable operation.

As shown in FIG. 4, a network operator 320 manages and supports the network of kiosks. A kiosk end user 321 uses the kiosk to post a picture or video. A host administrator 322 manages and supports the system as a whole. A kiosk recipient 323 receives pictures or videos sent from the kiosk end user. A media consumer 324 consumes (views, shares) pictures and videos posted by the kiosk end user. The media consumer will not likely have any relations to the user who posted the picture. The marketer 325 uses the data collected and generated by the kiosk.

Figure 5:
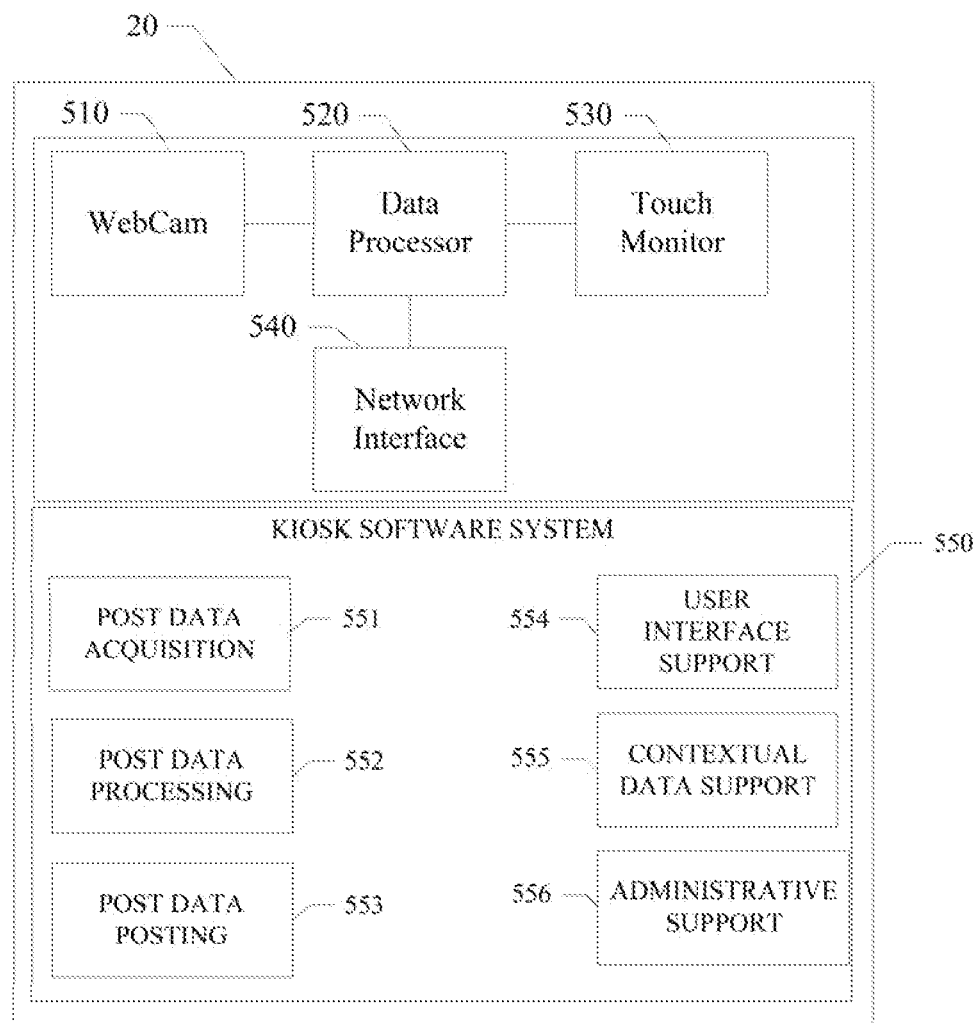
FIG. 5 illustrates a block diagram of the components of the kiosk in an example embodiment.

FIG. 5 illustrates a block diagram of the components of the kiosk 20 in an example embodiment. In an example embodiment, the kiosk 20 can include a web-enabled camera (webcam) 510, a data processor 520, a touch monitor 530, and a network interface 540. Each of these components individually is well-known in the art. Webcam 510 provides a capability to capture images and/or motion video. The images/video can be captured under control of the data processor 520 and transferred to the host server 10 via the network interface 540. The touch monitor 530 represents a well-known class of touch-sensitive display screen devices. Such devices can include a display screen for displaying a user interface to a kiosk end user. The user interface can include images, text, and portions of the screen corresponding to touch-sensitive areas. The touch-sensitive areas represent programmable command selections or means for data entry, which can be activated as the kiosk end user touches the touch-sensitive display screen in a touch-sensitive area with a finger. Examples of this user interface are described in more detail below in connection with FIGS. 9-11. The data processor 520 controls the operation of the webcam 510 and touch monitor 530. The data processor 520 can be configured similarly to a standard personal computer with random access memory (RAM), a non-volatile memory, and logic components for executing software (e.g., a kiosk processing module) from the memory. As described above, the kiosk software (e.g., the kiosk processing module) can be loaded and updated via an FTP server. The kiosk software can be further configured by the host server 10 or the host cloud 30 via the network interface 540. The network interface 540 can be a conventional interface to a public network, such as the internet, via any of a variety of technologies, including cellular networks, WiFi networks, satellite, wired cable, any of the networking technologies described herein, or the like.

Additionally, the kiosk 20 can include a kiosk software system 550 including a post data acquisition module 551, a post data processing module 552, post data posting module 553, a user interface support module 554, a contextual data support module 555, and an administrative support module 556. Each of these modules can be implemented as software or processing logic executable by the data processor 520. It will be apparent to those of ordinary skill in the art that portions of the software functionality described as implemented in the kiosk 20 can alternatively be implemented at the host site 110. Each of the modules of the kiosk software system 550 is described below.

Post data acquisition module 551 receives posting content from the kiosk end users at kiosks 20. The posting content can include image data, video data, and textual message data created by the kiosk end user at a kiosk 20. The post data acquisition module 551 can store this posting content locally at the kiosk 20. The post data acquisition module 551 can also receive usage data generated at the kiosks 20. The usage data represents data being generated on the kiosks 20 by the interactions of users of the kiosks 20. This usage data can be used by the host cloud 30 to enable marketing analysis of the kiosk end users.

Post data processing module 552 is used to perform any needed processing on the posting content received from the kiosk end users at the kiosks 20. For example, the post data processing module 552 can obtain appropriate overlays for the posting content. These overlays can be images or image templates, which can be combined with the pictures taken of the kiosk end user by the webcam 510. The use of these overlays is described in more detail below in connection with FIGS. 9-11. In one embodiment, the post data processing module 552 can also perform image analysis and/or image recognition of the images captured in the posting content. Image analysis and/or image recognition can also be performed on a live content feed. The image analysis and/or image recognition can be used to derive contextual data regarding the kiosk end user for customizing the overlay or advertising content displayed at the kiosk 20. Additionally, the image analysis and/or image recognition can be used to trigger actions, such as issuing coupons or awarding loyalty points to the kiosk end user. Also, the image analysis and/or image recognition can be used to tag or annotate captured photos with, for example, people names, location names, object identities, time/date, etc. In some cases, the image analysis and/or image recognition can be used to perform age verification on people visible in the captured image. The image analysis and/or image recognition can also be used to add brand-based meta data into the posting content as embedded meta data. The captured usage data and image analysis and/or image recognition information can also be used to generate analytics, which can be used to assess the effectiveness of product promotions and/or kiosk end user interactions. Additionally, the image analysis and/or image recognition can be used to filter the posting content for various purposes, including filtering out offensive or illegal behaviors, filtering out unwanted images, scanning for particular types of content, such as people with traits of interest, crowds versus individuals, filtering in/out posting content with particular tags, and the like. Additionally, the image analysis and/or image recognition can be used to support loyalty programs. For example, image analysis and/or image recognition can be used to identify a particular user pictured with a friend and award loyalty points on that basis. In another example, image analysis and/or image recognition can be used to identify a particular user pictured with a particular object or a brand product and award loyalty points on that basis. The image analysis and/or image recognition feature of various embodiments can also be used to support loyalty scavenger hunt programs. Image analysis and/or image recognition can be used to identify a particular user pictured with a particular object or a brand product and award loyalty scavenger credit on that basis.

Post data posting module 553 is used to post the posting content to user-selected community sites 40 in real-time. At kiosk 20, the kiosk end user can specify a particular community resource 40 (or more than one community resource 40), such as facebook.com or twitter.com and enter corresponding account credentials. The post data posting module 553 can obtain the identity of the selected community resource and the account credentials entered by the user at the kiosk 20 and facilitate authentication of the user's account on the corresponding community site(s) 40. The post data posting module 553 can also transfer the posting data to the selected community site(s) 40.

The user interface support module 554 is used to manage the user interface at the kiosk 20 for the kiosk end user. The details of the user interface are described below in connection with FIGS. 9-11.

The contextual data support module 555 is used to gather, initially process, and transfer the contextual data generated at the kiosk 20 by the user interaction at the kiosk 20. The details of the contextual data processing are described below in connection with FIG. 12.

The administrative support module 556 is used to manage the downloading, updating, and configuration of the various components of the kiosk 20. The administrative support module 556 can interact with the kiosk management module 210 of the content posting management system 200 of the host site 110 as described below.

In one embodiment, the kiosk 20 can include a conventional wireless transceiver for access to an internet connection. In some cases, a non-metallic or plastic enclosure for the wireless transceiver is provided at the kiosk 20 to improve wireless signal reception. The kiosk can also include a lighting system that auto-adjusts based on ambient light to provide good contrast and high visibility for the kiosk end user.

In one embodiment, the kiosk 20 can be implemented as a smartphone (e.g., iPhone) or tablet (e.g., iPad). Geo-fencing or GPS can be used to establish a geo-location associated with a mobile kiosk.

Figure 6:
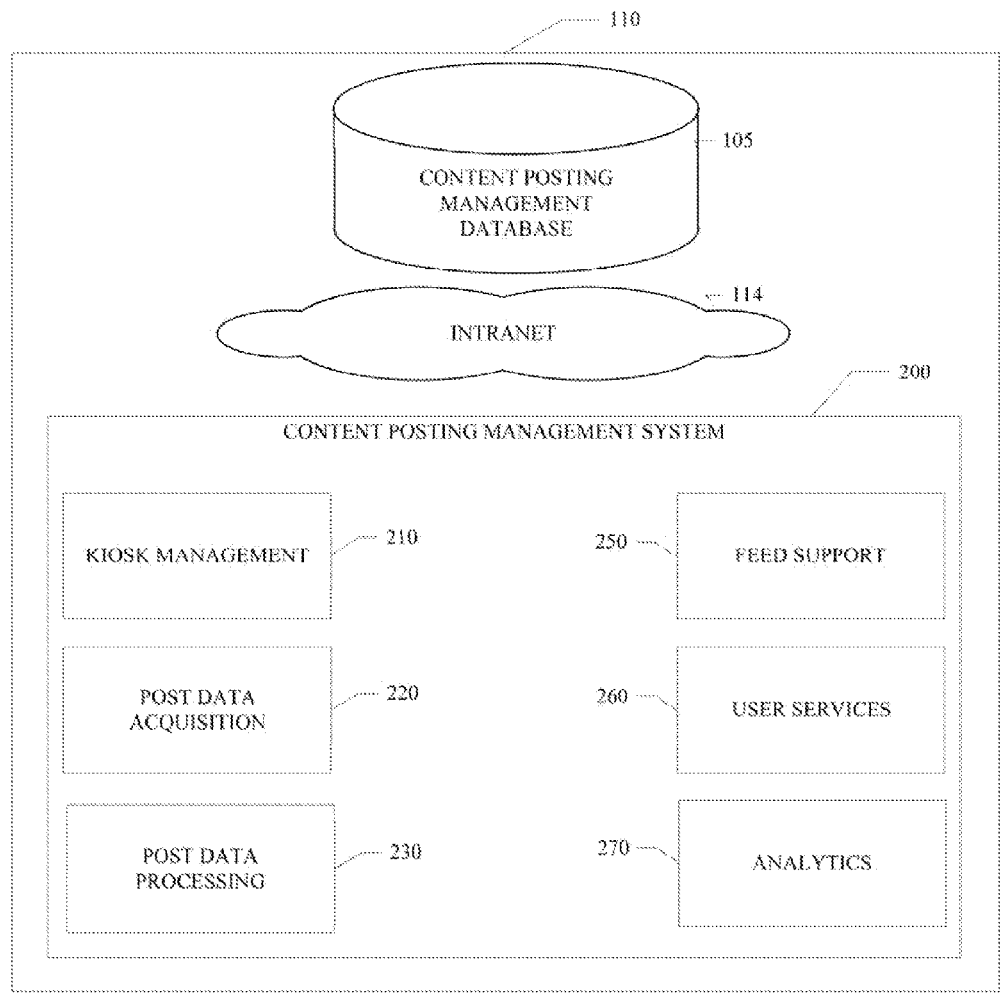
FIG. 6 illustrates a block diagram of the components of the host site in an example embodiment.

FIG. 6 illustrates a block diagram of the components of the host site 110 in an example embodiment. Referring to FIG. 6, the host site 110 can include a database 105, an optional intranet 114, and a content posting management system 200. The content posting management system 200 can include a kiosk management module 210, post data acquisition module 220, post data processing module 230, feed support module 250, user services module 260, and analytics module 270. Host site 110 can represent or include the functionality and host processing provided by the host server 10 as described herein. Each of the modules of the content posting management system 200 can be implemented as software or processing logic executable by a data processor of host site 110. It will be apparent to those of ordinary skill in the art that portions of the software functionality described as implemented at the host site 110 can alternatively be implemented on the kiosk 20. Each of the modules of the content posting management system 200 is described below.

Kiosk management module 210 provides configuration and control of the kiosks 20 via the network 120. In one embodiment, the configuration and control of the kiosks 20 can be delegated to the host cloud 30. The kiosk management module 210 of host site 110 and/or host cloud 30 can use a virtual network channel (VNC) to connect with each of the kiosks 20 in a private data exchange via a virtual private network (VPN) server. The VNC can be used to initialize and configure the kiosks 20 for operation in system 100. Additionally, the software in kiosks 20 can be downloaded or updated from a file transport protocol (FTP) server using well-known techniques under control of kiosk management module 210.

Post data acquisition module 220 receives posting content from the kiosks 20. The posting content can include image data, video data, and textual message data created by the kiosk end user at a kiosk 20. The post data acquisition module 220 can store this posting content in the database 105. In one embodiment, the posting data can be filtered, sorted, and indexed for improved retrieval and data mining. The post data acquisition module 220 can also receive usage data from the kiosks 20. The usage data represents data being generated on the kiosks 20 by the interactions of users of the kiosks 20. This usage data can be used by the host cloud 30 to enable marketing analysis of the kiosk end users.

Post data processing module 230 is used to perform any needed processing on the posting content received from the kiosks 20. The post data processing module 230 can also perform image analysis and/or image recognition of the images captured in the posting content. The image analysis and/or image recognition can be used to derive contextual data regarding the kiosk end user for customizing the overlay or advertising content delivered to the kiosk 20. Additionally, the image analysis and/or image recognition can be used to trigger actions, such as issuing coupons or awarding loyalty points to the kiosk end user. The image analysis and/or image recognition can also be used to add brand-based meta data into the posting content as embedded meta data. The captured usage data and image analysis and/or image recognition information can also be used to generate analytics, which can be used to assess the effectiveness of product promotions and/or kiosk end user interactions.

Feed support module 250 is used to support the syndicated websites 50 from the host site 110. Feed support module 250 can reconfigure or augment the posting content as necessary to make the posting content ready for transmission on an Atom or RSS feed. The feed support module 250 can also perform permission validation to ensure that the kiosk end user who created the posting content has approved the publication of the content to the syndicated sites 50. In some cases, the feed support module 250 may need to synchronize the access to the posting data by a plurality of syndicated sites 50.

User services module 260 provides the functionality with which a networked computer user operating from a user platform 140 or kiosk 20 can become a user/member of a content posting management service of host site 110 and sign in to interact with the content posting management services provided by the content posting management system 200. In an example embodiment, the functional components provided by the user services module 260 can include a user account module and a payment module. The user account module can be used to create and maintain a user account or user identity on the host site 110. The user account module can also be used to configure user settings, create and maintain a user/user profile on host site 110, and otherwise manage user data and operational user parameters on host site 110. The user data and operational parameters can be retained in database 105. The payment module can be used to submit payment for a user account and for enabling various user services. Additionally, when setting up and/or configuring a user account on host site 110, the user can also provide the authentication credentials necessary to access the user account.

In an alternative embodiment, a single sign-on capability can be implemented. A single sign-on capability can include the use of a variety of technologies for engaging a user. One such technology is a conventional Near Field Communication (NFC) device and protocol. NFC is a set of standards for smartphones and similar devices to establish radio communication with each other by touching them together or bringing them into close proximity. NFC can be used in an example embodiment at a kiosk 20, for example, to enable a kiosk end user to sign into a host user account using NFC with a mobile device, such as a smartphone. Alternatively, a QR Code (Quick Response Code) can be used to enable a kiosk end user to sign into a host user account. A QR Code is the trademark for a type of matrix barcode (or two-dimensional code), which can be used to encode user sign-in information. Alternatively, a host username and password associated with the user can be used to enable a kiosk end user to sign into a host user account. Alternatively, a host-enabled magnetic card or credit card associated with the user can be used to enable a kiosk end user to sign into a host user account with a swipe of the card. Alternatively, conventional face recognition and/or voice recognition technologies can be used to enable a kiosk end user to sign into a host user account. It will be apparent to those of ordinary skill in the art that a variety of other well-known technologies can be employed to enable a kiosk end user to sign into his/her account. In one embodiment, the user account at the host site 110 can have pre-configured community site 40 account credentials configured for the user. Upon signing into the user account at the host site 110 or at the kiosk 20, the preconfigured community site 40 account credentials can be automatically obtained for the user without the user having to re-enter these credentials when posting to a community site 40 for which community site 40 account credentials were pre-configured by the user.

Analytics module 270 is used to process captured kiosk usage data and image analysis and/or image recognition information to be used to generate analytics, which can be used to assess the effectiveness of product promotions and/or kiosk end user interactions. In an example embodiment, the analytics module 270 can generate data sets that correspond to an online presence relative to a plurality of kiosks. Similarly, the analytics module 270 can also generate data sets that correspond to the aggregated data relative to a plurality of kiosks, a plurality of venues, a plurality of kiosk user types, and/or performance of a plurality of advertisements. Moreover, the analytics module 270 can also generate aggregate relevance scores that correspond to the aggregated online presence relative to a plurality of brands, a plurality of content sources, and a plurality of user profiles. Thus, the analytics module 270 can generate a variety of relevance score data that corresponds to an online presence across multiple brands, multiple content sources, and multiple user profiles. These generated analytics data can be computed by the analytics module 270 and stored in database 105. Additionally, the analytics module 270 can generate data sets related to brands, kiosk sites, and user profiles. This information, retained in database 105, can be accessed and formatted into various reports, pages, lists, graphics, and the like as requested by a user. The analytics module 270 can also be configured to cause periodic or continual polling of posting content for engagement tracking analysis. In some cases, meta data added to the posting content can be used to generate analytics data related to the consumption of the posting content throughout the network. The analytics module 270 can also be configured to track the relationships between kiosk user engagement and direct responses. In this manner, analytics data can be generated as related to the effectiveness of particular promotional materials, user interface configurations, community site involvement, and the like.

Figure 7:
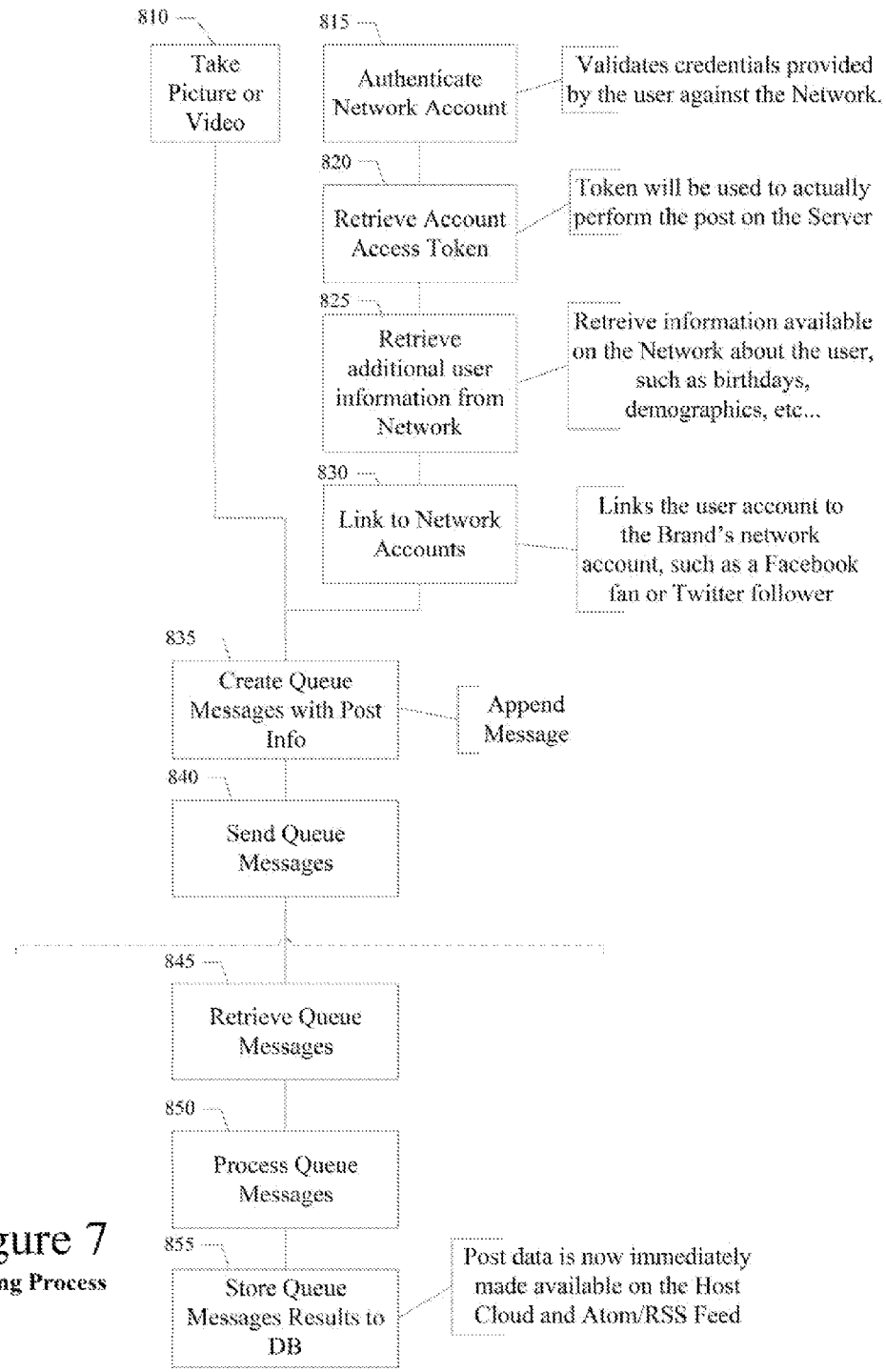
FIG. 7 illustrates the content posting process in an example embodiment.

FIG. 7 illustrates the content posting process in an example embodiment. Content posting in one embodiment involves the kiosk 20 or other location-specific, content-originating device, the host server 10, the community sites 40, and the syndicated sites 50. In one embodiment, an application or service, operating on the kiosk 20, is provided to simplify and facilitate content posting from a location-specific, image-capture device on kiosk 20 to a community resource 40, such as facebook.com, twitter.com, an email server, or the like. In another embodiment, an application or service operating on the host site 110 is provided to simplify and facilitate content posting from a kiosk 20 to a community resource 40. Once content is posted to a community resource 150 as facilitated by the host site 110, users at network-connected platforms 140 can view the postings at the community resource 150 sites.

An example embodiment of the posting process is shown in FIG. 7. Referring to FIG. 7 at block 810, a kiosk end user can interact with the user interface driven by the software of a kiosk 20 to cause the webcam 510 of kiosk 20 to snap a photograph or capture a video of the kiosk end user. The kiosk end user can also enter a brief message with the photograph or video. The kiosk end user can also specify a particular community resource 40 (or more than one community resource 40), such as facebook.com or twitter.com and enter corresponding account credentials for the selected community site(s) 40. In block 815, the kiosk 20 software (optionally in concert with the host server 10) can authenticate the user's account on the corresponding community site(s) 40. Upon successful user authentication, the kiosk 20 software can receive, in block 820, a token from the community site 40 at which the kiosk end user has been authorized to post content. The token can be used to actually perform the content post on the community site 40. Alternatively, the kiosk 20 software can generate a token based on information received from the community site 40. Having authenticated the kiosk end user on the community site 40, the kiosk 20 software, at block 825, can retrieve additional background information about the user from the community site 40 and/or any other network sites that may provide background information on the kiosk end user. This user background information can include information from the user's public profile on the community site 40 (e.g., demographics, user-related dates, location, interests, etc.). Further, the retrieved background information can be used to obtain additional background information from the same or different sites. In an alternative embodiment, the host server 10 can gather all or a portion of the user background information. In this manner, a variety of user background information can be gathered and used to derive contextual data regarding the kiosk end user for customizing the overlay or advertising content delivered to and/or displayed by the kiosk 20. Additionally, the user background information can be used to trigger actions, such as issuing coupons or awarding loyalty points to the kiosk end user. Given the location-specific information provided by the kiosk 20, the coupons, loyalty points, and other promotional materials can be location specific. The user background information can also be used to add brand-based meta data into the posting content as embedded meta data. The user background information can also be used to generate analytics, which can be used to assess the effectiveness of product promotions and/or kiosk end user interactions. In block 830, the kiosk 20 software or the host server 10 can establish a link between the kiosk end user's community site account and an account of a product/service brand being featured by the posting system 100. For example, the well-known functionality provided by facebook.com, 'like' for example, can be used to establish the kiosk end user as a Facebook fan of a particular brand having a facebook.com account, such as Coca Cola. In this manner, the brand gains a Facebook fan and a potential customer. In another example, the well-known functionality provided by twitter.com, for example, can be used to establish the kiosk end user as a Twitter follower of the particular brand having a twitter.com account. Similar links between the kiosk end user and a brand account can be similarly automatically established. In this way, various embodiments can support automatically linking a user account at the authenticated community site with a brand account at the authenticated community site. The links between the kiosk end user account and the brand account are only established if approved by the kiosk end user via an opt-in (or opt-out) selection described in more detail below. The particular brand featured and linked can be selected dynamically based on the contextual data associated with the particular kiosk end user, selected based on a particular ad campaign, or selected based on other criteria. In each case, the system 100 automatically establishes a link between the kiosk end user and the featured brand.

Referring still to FIG. 7 at block 835, the kiosk 20 software can assemble the posting content and any related messages or meta data into a queue message. As shown in FIG. 3 and described above, the data exchange between the kiosk 20 and the host server 10 can be configured through web services and web-based queuing (e.g., Amazon Simple Queue Service—SQS). A web queuing configuration facilitates the implementation of an automated workflow without requiring that either the sending system or the receiving system be available. Once the posting content and any related messages or meta data are incorporated into a queue message, the queue message can be sent to a web-based queuing system in block 840. The web-based queuing system can notify the host server 10 of the pending queue message. In block 845, the host server 10 can retrieve the queue message. In block 850, the host server 10 can process the queue message received from the kiosk 20. As part of this queue message processing, the host server 10 can disassemble the queue message and isolate the posting content generated on the kiosk 20 by the kiosk end user. The host server 10 can also isolate the user-entered message, if any, and any related meta data associated with the queue message. In block 855, the host server 10 can store the posting content and related identifying information into database 105. The host server 10 can also make the posting content available for pick up by the syndicated sites 50 in a content feed as described above. Additionally, queue messages can be used to transfer the contextual data gathered by the kiosk 20 to the host server 10. The contextual data can be used by the host server 10 and/or the host cloud 30 to select relevant ad content and to generate the analytics data sets associated with the user interactions at the kiosk 20.

Figure 8:
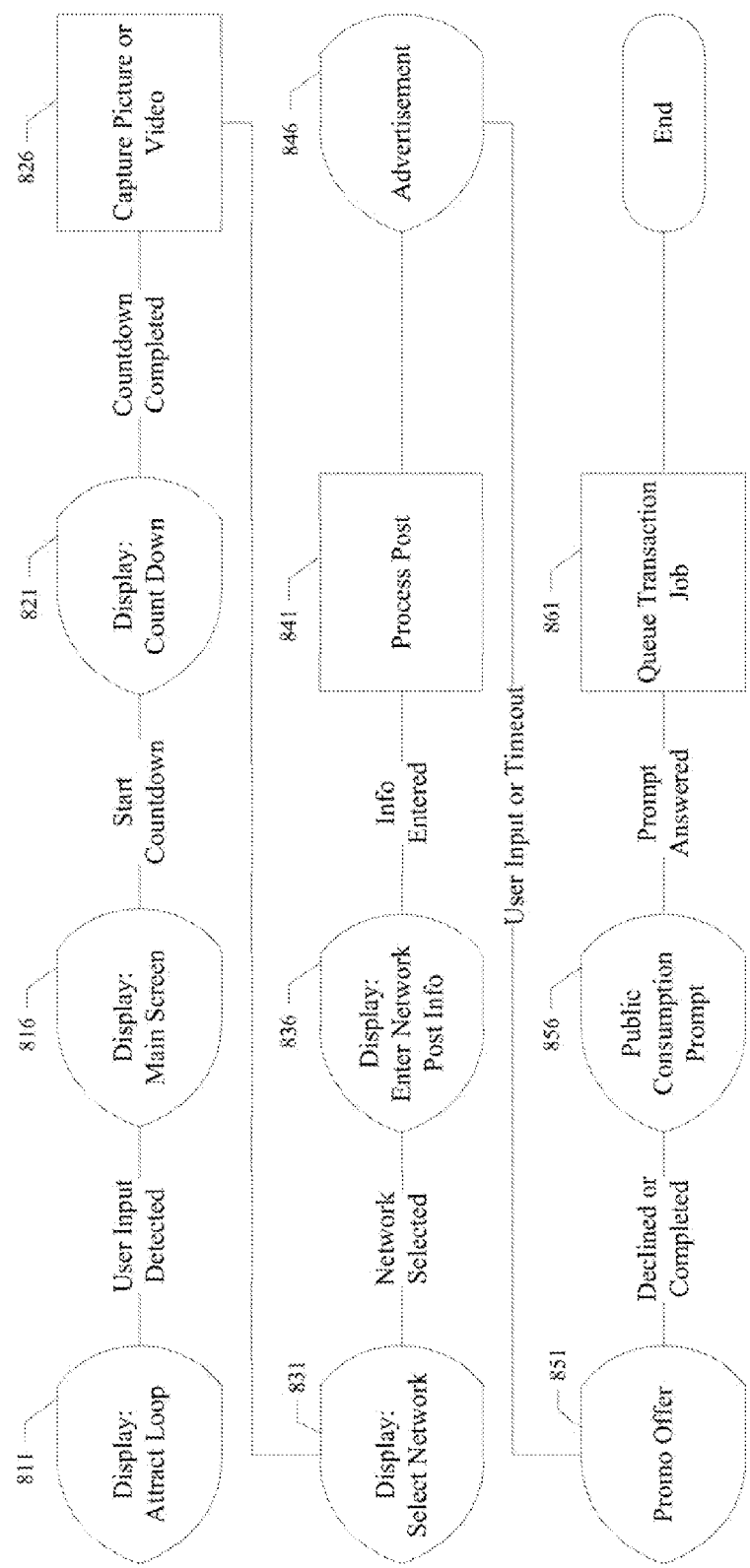
FIG. 8 illustrates the kiosk processing flow in an example embodiment.
Figure 9:
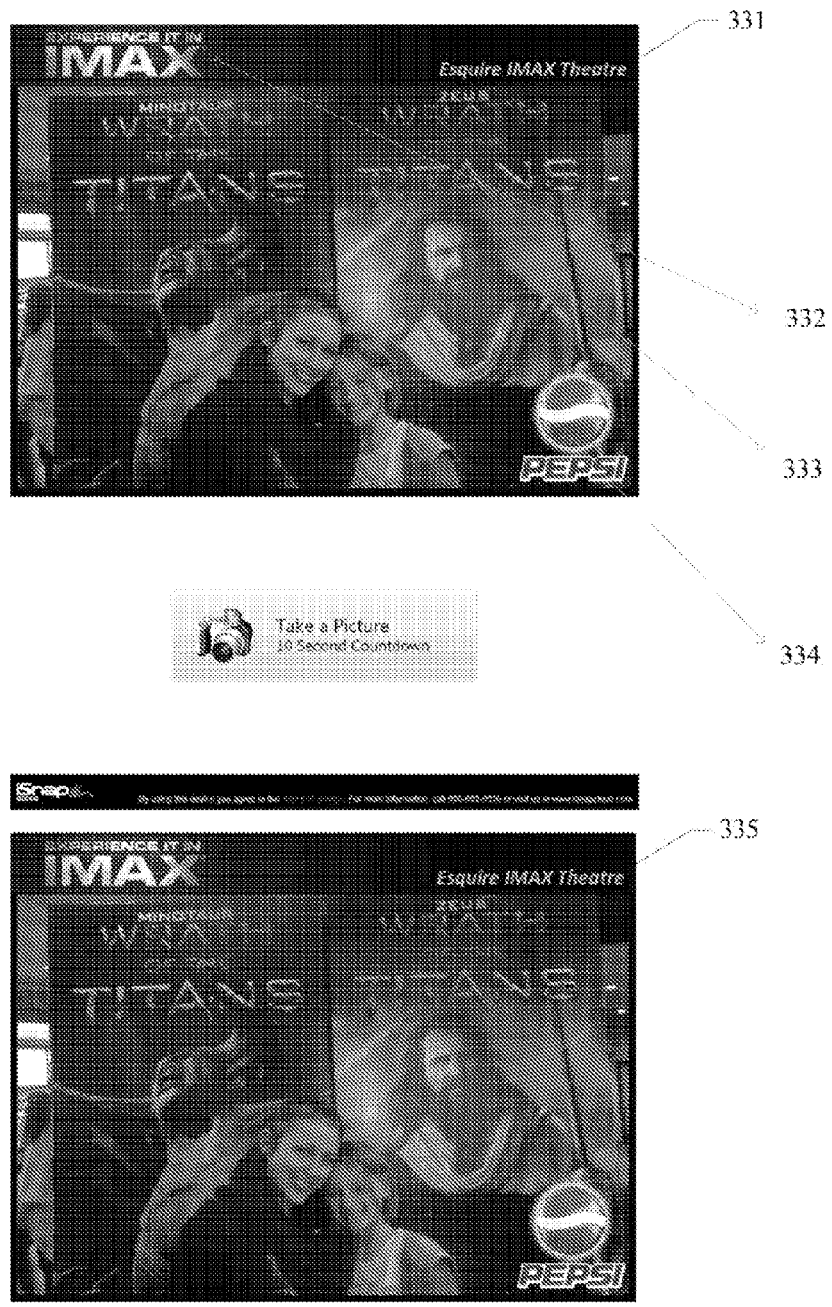
FIGS. 9-11 illustrate a kiosk user interface in an example embodiment.
Figure 10:
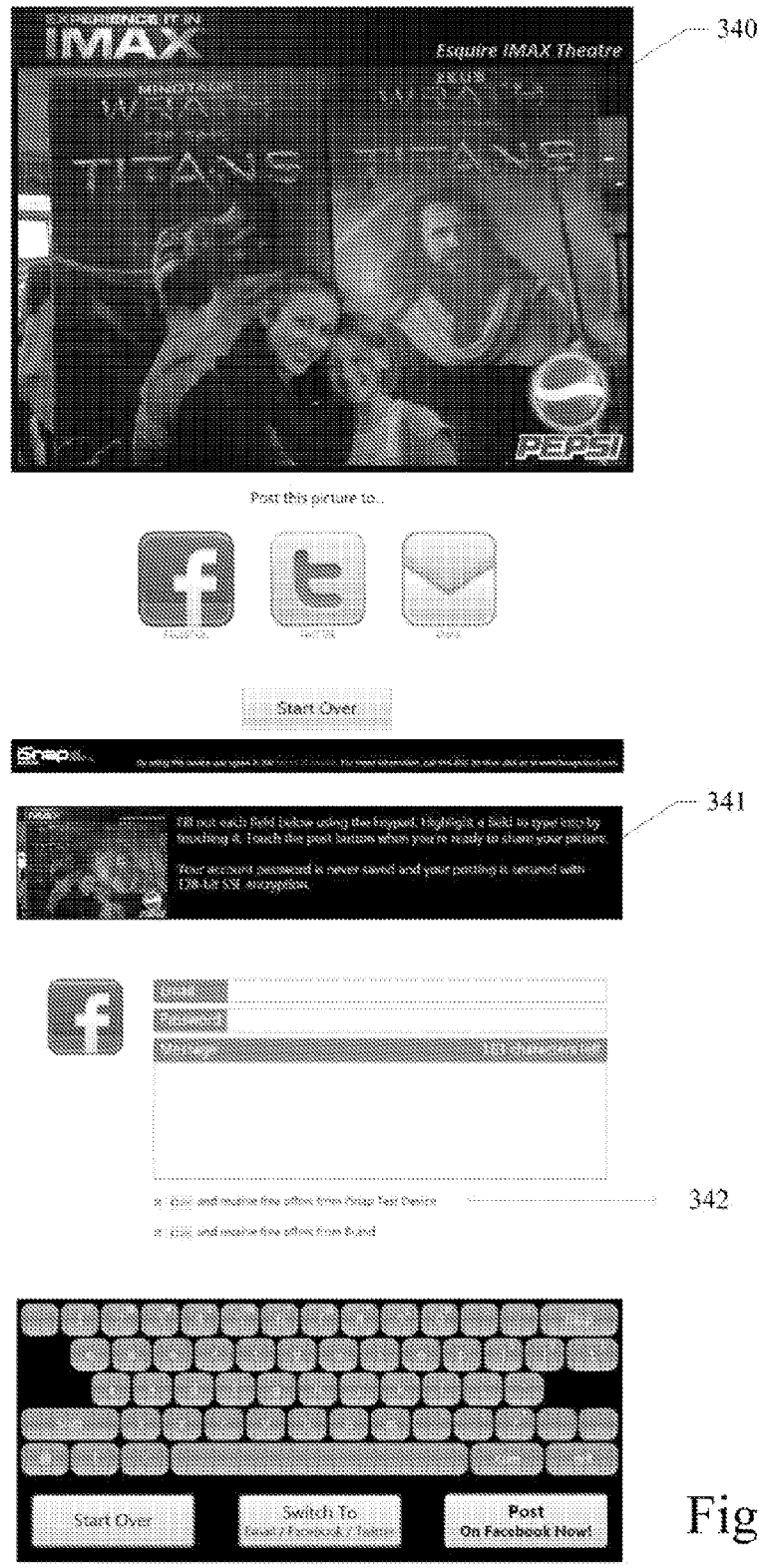
Figure 11:
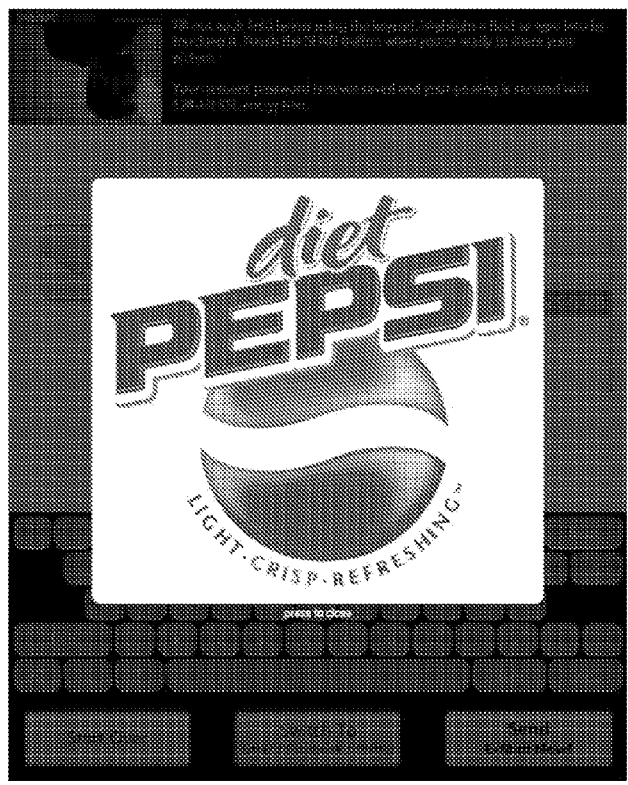
Figure 11:
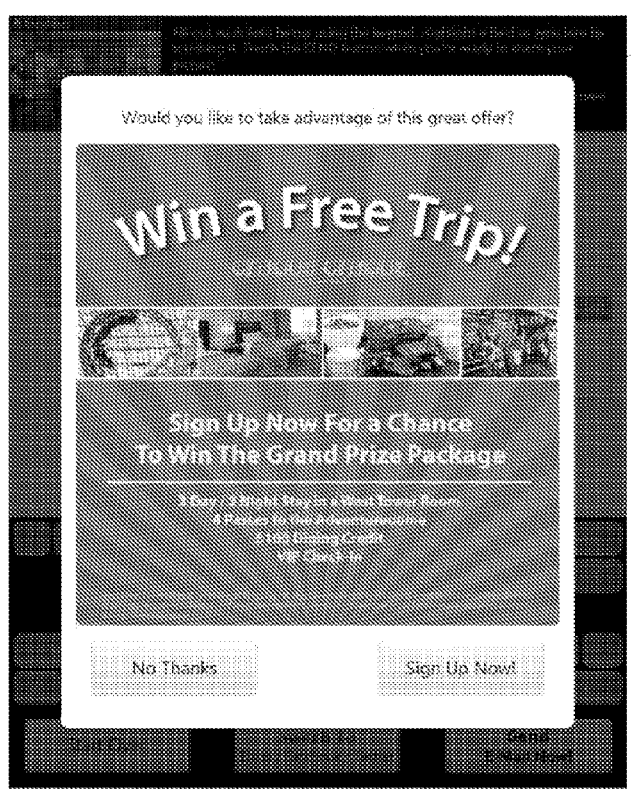

FIG. 8 illustrates the kiosk processing flow in an example embodiment. FIGS. 9-11 illustrate a kiosk user interface in an example embodiment. The kiosk processing flow of FIG. 8 will now be described with reference to the various kiosk user interface display screens shown by example in FIGS. 9-11. Referring to FIG. 8 at operation 811, the kiosk 20 software can display one or more images or motion video clips intended to attract users to begin an interaction with the kiosk 20. At operation 816, the kiosk 20 can detect the initial presence of a kiosk end user in proximity to a kiosk 20. This user detection can be determined in a variety of ways, including user activation of a touch-sensitive area on the touch monitor 530, inserting a card into the kiosk 20, speaking a command into a microphone of the kiosk 20, or merely standing within a proximity zone around the kiosk 20 as detected by a web-connected camera (webcam) of the kiosk 20. Once the kiosk end user presence is detected at the kiosk 20, the main display screen can be displayed on the kiosk monitor 530 in operation 816. An example of the main display screen in an example embodiment is shown in FIG. 9.

As shown in FIG. 9, the main display screen shown to a kiosk end user can be comprised of several elements. Each element can be displayed in a particular area of the display screen. For example, the main display screen in an example embodiment can include an overlay component, a live preview component, and a sponsorship component. The overlay component can represent a framing overlay, which serves to frame the image of the kiosk end user captured by the webcam 510. In one embodiment, the overlay can include a brand identifier or logo associated with the physical location or venue where the particular kiosk 20 is physically located. In this manner, the image captured at the kiosk 20 can be branded with the particular geo-location corresponding to the physical location where the image was captured. This location branding provides location context for the captured image. Similarly, time/date information can be included in the overlay and applied to the captured image, thereby providing timing context for the captured image. It will be apparent to those of ordinary skill in the art that other information, graphics, or animations can be similarly included in the overlay applied to the captured image.

As shown in FIG. 9, the main display screen in an example embodiment can also include a live preview component. The live preview component can be a live feed from the webcam 510 of kiosk 20, which may show the image of the kiosk end user against an image backdrop provided at the kiosk 20 location. In another embodiment, the backdrop can be a green screen, which allows any arbitrary image to be substituted into the preview frame in place of the green screen. In one embodiment, there may be multiple optional overlays and green screens from which the user may choose. The live preview component remains live until the kiosk end user takes a picture (e.g., activates an image capture button provided as part of the main screen) as described in more detail below.

As shown in FIG. 9, the main display screen in an example embodiment can also include a sponsorship component. The sponsorship component can be a text block, graphical element, logo, or the like representing a sponsoring brand. The sponsorship component is added to the captured image as a promotional element. The particular sponsor can be selected based on the contextual data, an advertising campaign, or other sponsor selection criteria. It will be apparent to those of ordinary skill in the art that a plurality of sponsorship components can be selected and presented on the main display screen. In one embodiment, there may be multiple optional sponsors (brands, products, advertisers, etc . . . ) presented in a list from which the user may choose a particular sponsor to be represented in the sponsorship component.

As shown in FIG. 9, regarding main screen 331, a user sees a live preview of what their picture or video will look like with the overlay and background. Regarding Overlay 332, a graphical element is laid over the video feed. The graphical element can be static or animated. Regarding Live Preview 333, a live feed from the attached capture device will be shown on the screen. Regarding Sponsorship 334, additional graphical elements can be added for promotional purposes. Regarding Countdown 335, the system will count down before the picture is taken. At the end of the countdown, the Live Preview will 'shutter' or 'flash' in a way to indicate that the picture is taken, likening to a camera's shutter.

Referring again to FIG. 8, the main display screen has been displayed in operation 816 as described above. As also described, an image capture button is provided as part of the main screen. At operation 821, a countdown sequence is initiated. This countdown is illustrated in the sample screen shot shown in FIG. 9. The countdown sequence provides an opportunity for the kiosk end user to prepare for the moment when the picture is taken at the kiosk 20. At the end of the countdown sequence, the live preview component of the main display screen will momentarily flash or shutter to indicate that a picture has been taken (i.e., an image of the kiosk end user has been captured). Additionally, an audible 'shutter' sound can be played at the kiosk 20 to imitate the sound of a traditional camera's shutter release mechanism. At operation 826 shown in FIG. 8, the countdown sequence has completed and the kiosk end user's image has been captured. Alternatively, the kiosk end user can activate the image capture button to take the picture immediately. At operation 826, the kiosk end user's image, in combination with the overlay component and the one or more sponsorship components, has been captured.

Referring still to FIG. 8 at operation 831, the kiosk end user is prompted to select a community site or network 40 to which the captured image (as part of the posting data) should be posted. The display screen shown to the user in this instance is illustrated in FIG. 10. As illustrated in FIG. 10, the captured image is shown in combination with icons corresponding to several selectable community sites (e.g., facebook.com, twitter.com, and an email server). The kiosk end user can select one or more of the community sites 40 for posting the captured image by touching the corresponding icon(s).

Once the kiosk end user selects one or more community sites 40 in the manner described above, operation 836 prompts the kiosk end user to enter the account information or other access information to enable the posting system 100 to post the captured image (as part of the posting data) to the selected community site(s) 40. In one example, the kiosk end user may enter his/her username and password corresponding to the particular user's account on the selected community site 40. As shown in FIG. 10, the kiosk end user is prompted to enter the access information. Additionally, the kiosk end user can enter a brief message, which is appended to the captured image as part of the posting content. If the kiosk end user has selected an email server as the target of the post, the kiosk end user is prompted for entry of the target email address. Finally, the kiosk end user can be prompted at kiosk 20 for entry of opt-in or opt-out selections. The display screen shown to the user in this instance is also illustrated in FIG. 10. The opt-in or opt-out selections enable the kiosk end user to specify: 1) whether or not the user wants to be included in various marketing campaigns, 2) whether or not the user wants to be linked to the accounts of selected brands, 3) whether or not the user authorizes the use of the user's email address for marketing, and 4) whether or not the user wants to be included in various loyalty or discount programs. It will be apparent to those of ordinary skill in the art that many other options related to the use of the posting content or the kiosk end user's information can be similarly offered to the kiosk end user.

Once the posting information and opt-in or opt-out selections are received, the posting content can be processed in operation 841. As part of this post processing, the posting content can be modified, re-scaled, image-enhanced, augmented, copy-protected, or otherwise processed to facilitate the transfer of the posting content to the selected community sites 40 in the manner described above. In operation 846, the captured image on the kiosk monitor 530 can be replaced with a promotional image, such as an advertisement or promotional video. An example of such a promotional image is illustrated in FIG. 11. The particular brand promoted in the promotional image can be selected dynamically based on the contextual data associated with the particular kiosk end user, selected based on a particular ad campaign, or selected based on other criteria. In operation 851, the captured image on the kiosk monitor 530 can also be replaced with a promotional offer, such as coupon, a prize offering, or other incentive or loyalty-based option. An example of such a promotional offering is illustrated in FIG. 11. In one embodiment, the kiosk end user is given a chance to sign up for a promotional offer by entering some additional information, such as an address, phone number, email address, or the like. The entered information enables a promoter or marketer to directly target the user for follow-up advertisements. As shown in FIG. 11 in regard to Advertisement 351, an image or video will play after a post. In regard to the Promo Offer 352, the user is given a chance to sign up for a promotional offer by entering some additional information, such address, phone, etc . . .

As shown in FIG. 10, regarding Select Network 340, the user will select the network or community to which they wish to send or post their picture or video. Regarding Enter Network Post Information 341, the user will enter the required information to post to the network or community, along with a brief message. Regarding Opt-In 342, a user has the option to 'opt-in' to select marketing campaigns, often providing their email address and 'linking' their network accounts (liking, following, etc . . . ).

Referring still to FIG. 8 at operation 856, the kiosk end user is prompted to specify whether or not the user authorizes the publication of the user's posting content to the syndicated sites 50 or otherwise authorizes the publication of the posting content or related user data for public consumption. The kiosk end user's selection in regard to public consumption, the opt-in or opt-out selections, the captured image, any additional user-entered message, any related meta data, and any related contextual data is retained as part of the posting content package that is queued for transfer to the host server 10 in operation 861. Once the posting content package is queued using a web-based queuing service as described above, the kiosk 20 processing for the kiosk end user's session with the kiosk 20 is complete.

Figure 12:
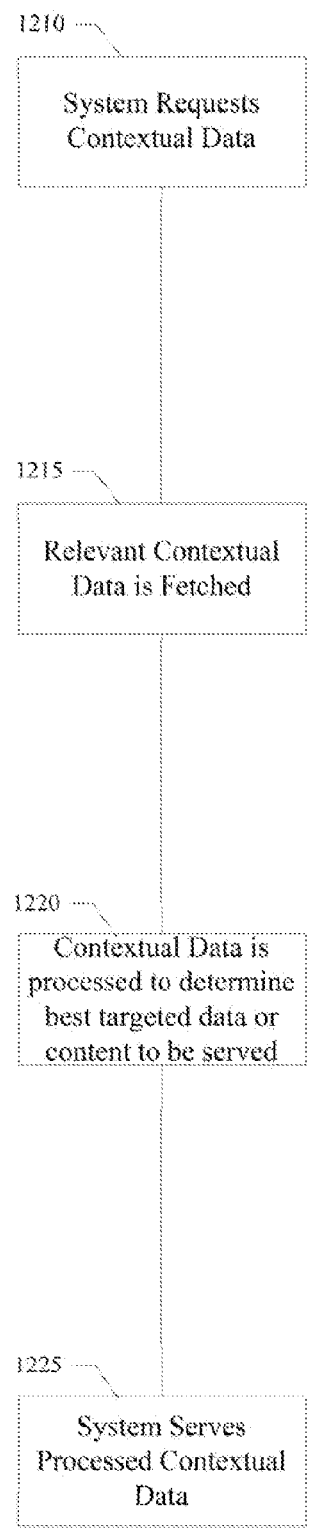
FIG. 12 illustrates the contextual data processing flow in an example embodiment.

FIG. 12 illustrates the contextual data processing flow in an example embodiment. In general, the contextual data includes data captured from various sources, in blocks 1210 and 1215, that specifies user characteristics, location, time, user actions, ancillary data obtained from sites with which the user has interacted, community resources related to the user, user data or profiles obtained via search engines, demographic data, image recognition data, text recognition data, explicit user selections or preference data, and a variety of other information that is indicative of user affinity for particular types of products/services or event targeting. In an example embodiment, the contextual data can include data captured from various sources regarding users, locations, and patrons not interacting with the kiosk that can be used for targeting. In an example embodiment, the contextual data can include any of the following types of data:

- Physical location of image-capture device (city/state, store)
- Image recognition (kiosk end user and non-using patrons)
    - People—detected in the image by image analysis
    - Objects (clothing, brands, products)—detected in the image by image analysis
    - Sentiment Analysis—detected in the image by image analysis
    - Tracking over time (e.g., between M-Th 4 PM to 8 PM, a majority of patrons are women between ages 20-30)
- User information pulled from other networks (e.g., birthday, gender, location, etc . . . from Facebook)
- User information captured by signed-in host user
    - Information entered by the kiosk end user
    - Surveys
    - Lead Generation
- Time of day, Date In block 1220 shown in FIG. 12, the host server 10, in combination with the kiosk 20, can gather and process the contextual data and develop a set of ad matching or filtering criteria, which can be used by the host server 10 to request relevant ad content from the ad servers 60. In an alternative embodiment, the host server 10 can maintain its own database of ad content, which can be used as a source of ad content relevant to the set of ad matching or filtering criteria, which in turn, is relevant to the contextual data gathered by the host server 10. As shown in block 1220, the system takes whatever contextual data is applicable to the targeted functionality, processes the data and returns a result that best targets the requesting functionality.

As shown in block 1225 of FIG. 12, the host server 10 and/or the kiosk 20 can use the contextual data to fetch and serve relevant ad content from the ad servers 60. Additionally, the host server 10 and/or the kiosk 20 can use the contextual data to fetch and serve relevant promotional content such as surveys, coupons, offers, contests, lead generation, co-sponsorships, and the like. As described above, the relevant ad or promotional content can be served to a kiosk end user in the overlay component, live preview component, or sponsorship component of the kiosk 20 user interface described above. As shown in block 1225 of FIG. 12, once requested contextual data is processed, the targeted functionality will be presented to the end user in various forms, including: Display Advertising (primary or secondary screen), Banner Advertising, Survey, Promotional Offers, Coupons, Contests, Lead Generation, and Co-Sponsorship/Dynamic Overlay.

Figure 13:
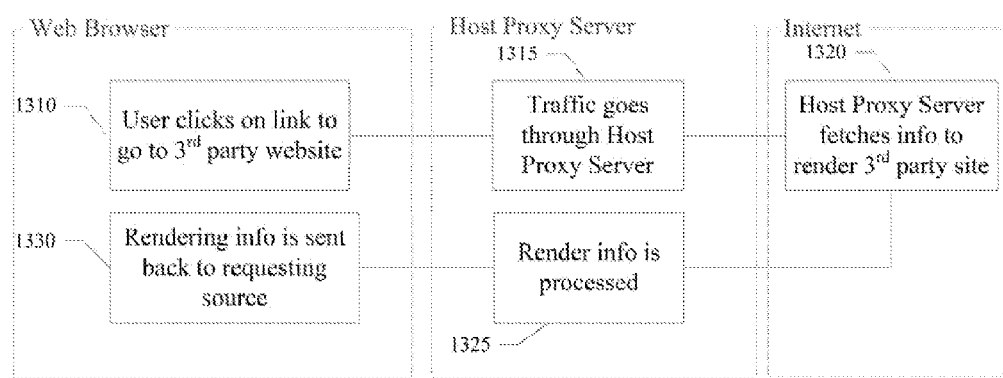
FIG. 13 illustrates the reverse proxy processing in an example embodiment.

FIG. 13 illustrates the reverse proxy processing in an example embodiment. The reverse proxy process enables a host site, such as host site 110, to intercept a user's activation of a link to a 3rd party website and process the content returned to the user. For example, as shown in FIG. 13, a user has used his/her web browser and clicked on a link intending to go to a 3rd party website in block 1310. The activation of this link causes the user to be diverted to a host proxy server in block 1315. The host proxy server can fetch the content to render the 3rd party website for the user in block 1320. However, because the link activation is still under control of the host proxy server, the host proxy server can add or modify the content of the 3rd party website before returning the content to the user. For example, at block 1325, the content of the 3rd party website can be processed in a variety of ways, including among the following:

- Additional content can be added to the 3rd party web page, such as a border or header to make it appear that the page is served by the host.
- Track the tags and actions that are relevant to the host, which can be tracked within the host system without requiring additional code to be added to the $3^{rd}$ party site.
- Track certain pages or content on the $3^{rd}$ party site, wherein the pages or content can be used to infer that an action has taken place. For example, if the user eventually gets to a 'thanks for ordering' page on the $3^{rd}$ party site, the host can determine that the user has completed an order, and the host can track that event in the host system.

Thus, in the manner described above, the content of the 3rd party website can be processed in a variety of ways in block 1325. The processed $3^{rd}$ party website content can be returned to the user in block 1330 by sending rendering information back to the requesting source. As a result, the user can see the requested $3^{rd}$ party content after processing by the host proxy server. An example of this processing flow by the host proxy server is provided below:

- User creates a post at a host kiosk in the Excalibur Hotel, for example, to Facebook.
- Appended messages are configured with a shortened link to an external site, such as "-Click the link for a free night's stay at the Excalibur Hotel. http://isnap.at/BjFecVB".
- When posted, the message reads: "Love it here!!-Click the link for a free night's stay at the Excalibur Hotel. http://isnap.at/BjFecVB".
- The original poster's friend sees the post and clicks on the link.
- Upon clicking the link, the original poster's friend is then sent to a website hosted by the host, but includes the content of the 'sign up' page for Excalibur Hotel ($3^{rd}$ party website). Note that no modifications were made to the Excalibur Hotel website at all to tie it to the host for tracking or any other purposes.
- The user completes the form for a free night stay at the Excalibur Hotel.
- The host proxy server detects that the form is 'completed' and logs this action.
- The marketer at the Excalibur Hotel can now see in the host cloud 30 that a user completed a form, with the lead originating from a host kiosk in the Excalibur Hotel.

Figure 14:
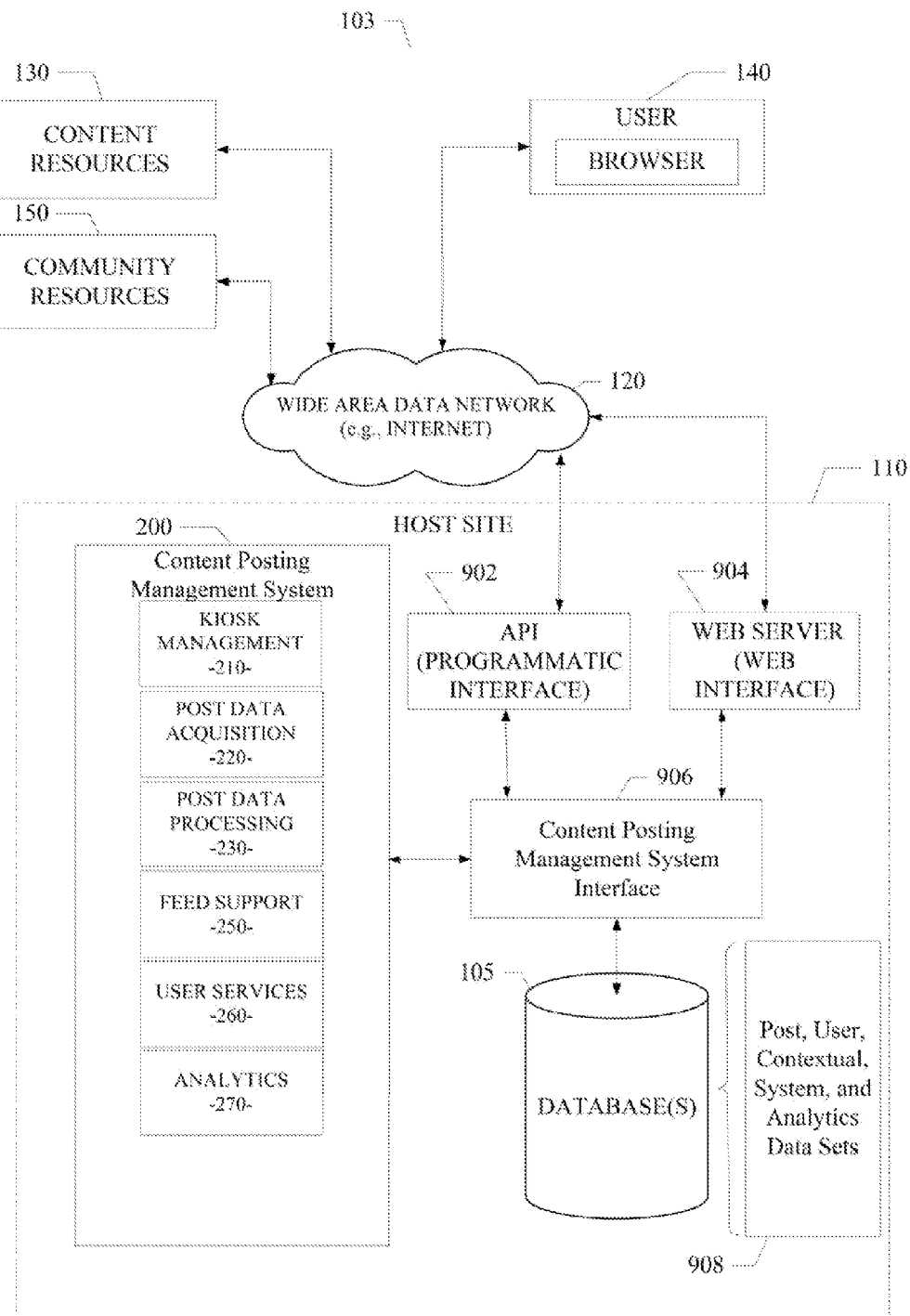
FIG. 14 illustrates another example embodiment of a networked system in which various embodiments may operate.

FIG. 14 illustrates another example embodiment of a networked system in which various embodiments may operate. In the embodiment illustrated, the host site 110 is shown to include the content posting management system 200. The content posting management system 200 is shown to include the functional components 210 through 270 as described above. In a particular embodiment, the host site 110 may also include a web server 904 having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the content posting management system 200 either directly or via an interface 906. The content posting management system 200 may also be configured to access a data storage device 105 either directly or via the interface 906.

Figure 15:
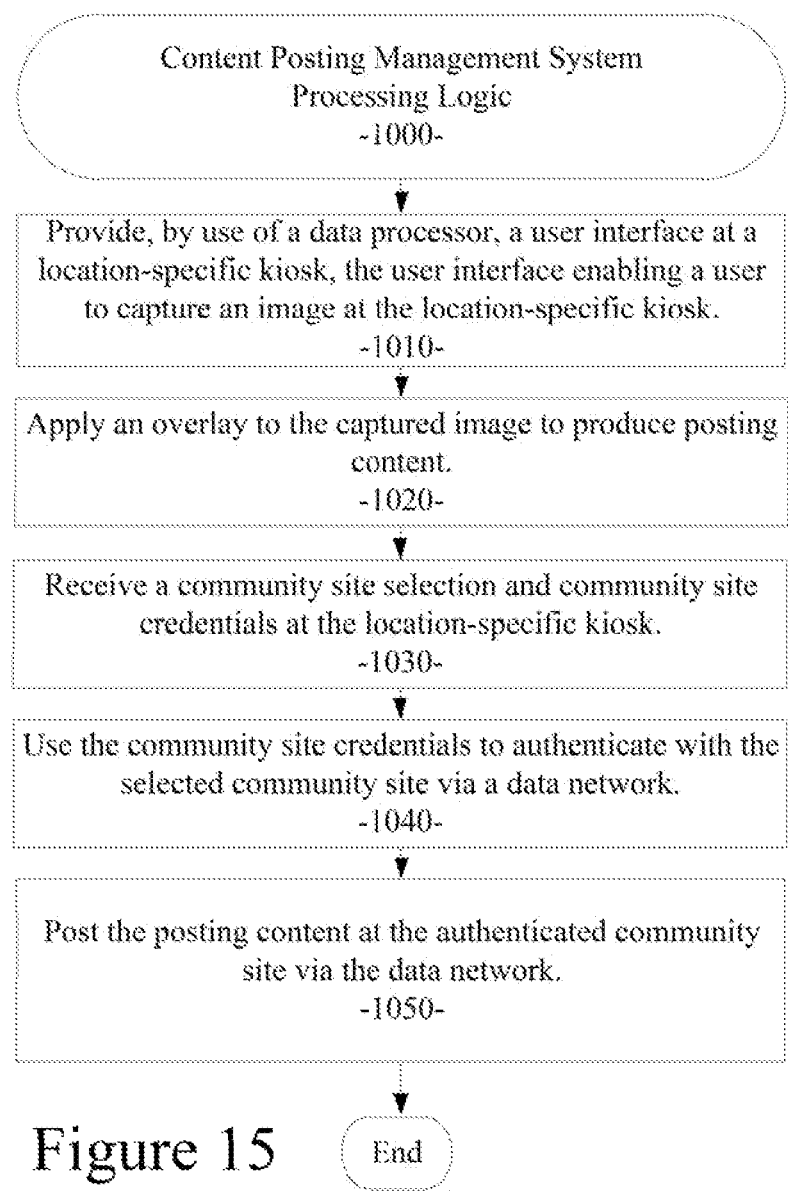
FIG. 15 is a processing flow diagram illustrating an example embodiment of a content posting management system as described herein.

FIG. 15 is a processing flow diagram illustrating an example embodiment of a content posting management system as described herein. The method of an example embodiment includes: providing, by use of a data processor, a user interface at a location-specific kiosk, the user interface enabling a user to capture an image at the location-specific kiosk (processing block 1010); applying an overlay to the captured image to produce posting content (processing block 1020); receiving a community site selection and community site credentials at the location-specific kiosk (processing block 1030); using the community site credentials to authenticate with the selected community site via a data network (processing block 1040); and posting the posting content at the authenticated community site via the data network (processing block 1050).

Figure 16:
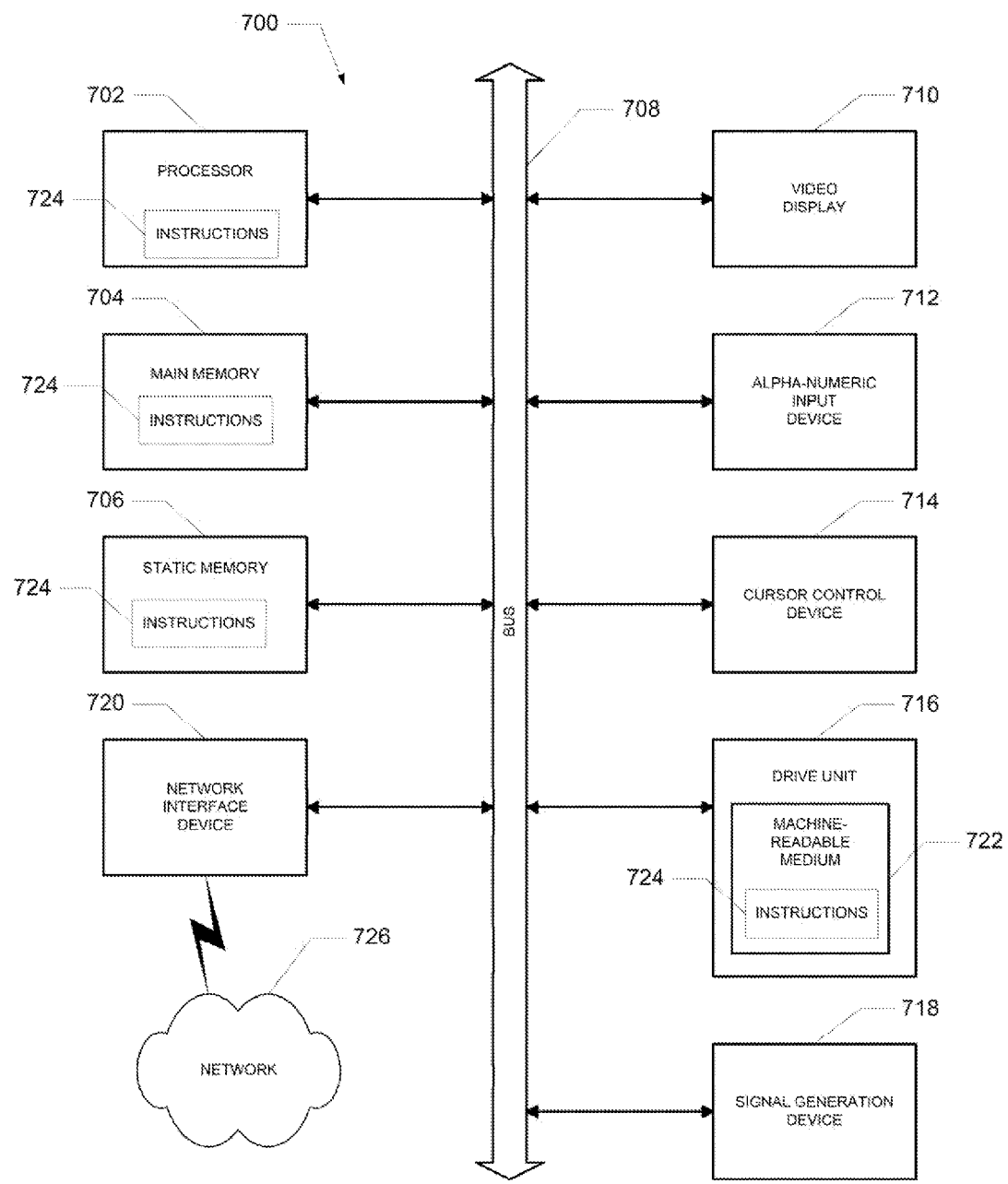
FIG. 16 shows a diagrammatic representation of machine in the example form of a computer system within which a set of instructions when executed may cause the machine to perform any one or more of the methodologies discussed herein.

FIG. 16 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, magnetic media, and other data storage devices.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method comprising:
providing, by use of a data processor, a user interface at a location-specific kiosk, the user interface enabling a user to capture an image at the location-specific kiosk using a camera of the kiosk, the user interface further enabling the user to capture motion video at the kiosk using the camera of the kiosk;
applying an overlay to the captured image to produce posting content;
enabling the user to sign into a host user account associated with the location-specific kiosk at the location-specific kiosk;
automatically retrieving pre-configured community site selections and community site credentials using information from the host user account;
using the automatically retrieved community site credentials to authenticate with one or more selected community sites via a data network, the one or more selected community sites being social network sites providing independent access via a website; and
posting the posting content at the one or more authenticated community sites via the data network without requiring the user to explicitly select the authenticated community sites.

2. The method as claimed in claim 1 wherein the overlay is a location-specific overlay indicative of a location of the location-specific kiosk.

3. The method as claimed in claim 1 including adding at least one brand identifier to the posting content.

4. The method as claimed in claim 1 wherein the community site selections include at least one community site selection from the group: facebook.com, twitter.com, and email.

5. The method as claimed in claim 1 including configuring the posting content for publication at a syndicated site via an Atom, RSS, REST, or web service feed, the syndicated site being from the group: a website, a feed-enabled device, a web widget, and an alternate display device.

6. The method as claimed in claim 1 including gathering contextual data related to the user interaction with the location-specific kiosk, the contextual data being indicative of user affinity.

7. The method as claimed in claim 1 including gathering contextual data related to the user interaction with the location-specific kiosk and using the contextual data to customize the presentation of promotional content at the location-specific kiosk.

8. The method as claimed in claim 1 including sending the posting content to a host server via a web-based queuing system.

9. The method as claimed in claim 1 including automatically linking a user account at the one or more authenticated community sites with a brand account at the one or more authenticated community sites, the automatic linking only being performed if the user opted into automatic linking.

10. The method as claimed in claim 1 including performing image recognition on an image from the location-specific kiosk and using information obtained from the image recognition to customize the presentation of information at the location-specific kiosk.

11. A system comprising:
a data processor; and
a kiosk processing module, executable by the processor, to:
provide, by use of the data processor, a user interface at a location-specific kiosk, the user interface enabling a user to capture an image at the location-specific kiosk using a camera of the kiosk, the user interface further enabling the user to capture motion video at the kiosk using the camera of the kiosk;
apply an overlay to the captured image to produce posting content;
enable the user to sign into a host user account associated with the location-specific kiosk at the location-specific kiosk;
automatically retrieve pre-configured community site selections and community site credentials using information from the host user account;
use the automatically retrieved community site credentials to authenticate with one or more selected community sites via a data network, the one or more selected community sites being social network sites providing independent access via a website; and
post the posting content at the one or more authenticated community sites via the data network without requiring the user to explicitly select the authenticated community sites.

12. The system as claimed in claim 11 wherein the overlay is a location-specific overlay indicative of a location of the location-specific kiosk.

13. The system as claimed in claim 11 being further configured to add at least one brand identifier to the posting content.

14. The system as claimed in claim 11 wherein the community site selections include at least one community site selection from the group: facebook.com, twitter.com, and email.

15. The system as claimed in claim 11 being further configured to configure the posting content for publication at a syndicated site via an Atom, RSS, REST, or web service feed, the syndicated site being from the group: a website, a feed-enabled device, a web widget, and an alternate display device.

16. The system as claimed in claim 11 being further configured to gather contextual data related to the user interaction with the location-specific kiosk, the contextual data being indicative of user affinity.

17. The system as claimed in claim 11 being further configured to gather contextual data related to the user interaction with the location-specific kiosk and using the contextual data to customize the presentation of promotional content at the location-specific kiosk.

18. The system as claimed in claim 11 being further configured to send the posting content to a host server via a web-based queuing system.

19. The system as claimed in claim 11 being further configured to automatically link a user account at the one or more authenticated community sites with a brand account at the one or more authenticated community sites, the automatic linking only being performed if the user opted into automatic linking.

20. A non-transitory machine-useable storage medium embodying instructions which, when executed by a machine, cause the machine to:
provide a user interface at a location-specific kiosk, the user interface enabling a user to capture an image at the location-specific kiosk using a camera of the kiosk, the user interface further enabling the user to capture motion video at the kiosk using the camera of the kiosk;
apply an overlay to the captured image to produce posting content;
enable the user to sign into a host user account associated with the location-specific kiosk at the location-specific kiosk;
automatically retrieve pre-configured community site selections and community site credentials using information from the host user account;
use the automatically retrieved community site credentials to authenticate with one or more selected community sites via a data network, the one or more selected community sites being social network sites providing independent access via a website; and
post the posting content at the one or more authenticated community sites via the data network without requiring the user to explicitly select the authenticated community sites.

21. The machine-useable storage medium as claimed in claim 20 being further configured to include a proxy server for facilitating authentication of a user account on the community site.

22. The machine-useable storage medium as claimed in claim 20 being further configured to include a reverse proxy enabling a host site to intercept the user's access to a third party website and process content returned to the user from the third party website.

23. The machine-useable storage medium as claimed in claim 20 being further configured to provide a single sign-on capability to enable the user to sign into a user account.

24. The machine-useable storage medium as claimed in claim 20 being further configured to enable the user to post to multiple community sites using a single user input.

* * * * *